United States Patent
Tsuji et al.

(10) Patent No.: US 10,498,669 B2
(45) Date of Patent: Dec. 3, 2019

(54) COMMUNICATION SYSTEM, SWITCH, CONTROLLER, ANCILLARY DATA MANAGEMENT APPARATUS, DATA FORWARDING METHOD, AND PROGRAM

(71) Applicant: NEC CORPORATION, Tokyo (JP)

(72) Inventors: Akira Tsuji, Tokyo (JP); Shuichi Karino, Tokyo (JP); Gen Morita, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 389 days.

(21) Appl. No.: 14/912,334

(22) PCT Filed: Aug. 19, 2014

(86) PCT No.: PCT/JP2014/071658
§ 371 (c)(1),
(2) Date: Feb. 16, 2016

(87) PCT Pub. No.: WO2015/025845
PCT Pub. Date: Feb. 26, 2015

(65) Prior Publication Data
US 2016/0191421 A1    Jun. 30, 2016

(30) Foreign Application Priority Data
Aug. 20, 2013   (JP) .................................. 2013-170682

(51) Int. Cl.
*H04L 12/947*  (2013.01)
*H04L 12/933*  (2013.01)
(Continued)

(52) U.S. Cl.
CPC .......... *H04L 49/25* (2013.01); *H04L 12/6418* (2013.01); *H04L 45/74* (2013.01); *H04L 49/15* (2013.01); *H04L 69/22* (2013.01)

(58) Field of Classification Search
CPC .......... H04L 49/25; H04L 69/22; H04L 49/15; H04L 45/74; H04L 12/6418
(Continued)

(56) References Cited

U.S. PATENT DOCUMENTS

2006/0074941 A1*   4/2006   Flynn, Jr. .............. G06F 3/0605
2006/0153530 A1*   7/2006   Cai .......................... H04N 9/896
                                                                        386/208
(Continued)

FOREIGN PATENT DOCUMENTS

JP    2011-160363 A    8/2011
JP    2011-166384 A    8/2011
(Continued)

OTHER PUBLICATIONS

Liu et al., M2cloud: Software Defined Multi-site Data Center Network Control Framework for Multi-tenant SIGCOMM'13, Aug. 12-16, 2013, pp. 517-518 (Year: 2013).*
(Continued)

*Primary Examiner* — Shailendra Kumar
(74) *Attorney, Agent, or Firm* — Sughrue Mion, PLLC

(57) ABSTRACT

A communication system, comprises: a first network switch that transmits to a network controller a control message containing ancillary data; the network controller that retrieves the ancillary data from the control message containing the ancillary data, holds the ancillary data, and transmits to a second network switch a control message containing the ancillary data; and the second network switch that receives the control message containing the ancillary data from the network controller, retrieves a packet to be outputted and the ancillary data, and forwards the packet and the ancillary data to a specified destination.

15 Claims, 29 Drawing Sheets

(51) Int. Cl.
*H04L 12/741* (2013.01)
*H04L 29/06* (2006.01)
*H04L 12/64* (2006.01)

(58) Field of Classification Search
USPC .................................................... 370/392
See application file for complete search history.

(56) References Cited

U.S. PATENT DOCUMENTS

| | | | | |
|---|---|---|---|---|
| 2009/0086761 | A1* | 4/2009 | Mirmobini | H04N 21/235 370/476 |
| 2010/0064129 | A1* | 3/2010 | Honjo | H04L 63/0485 713/150 |
| 2012/0173694 | A1 | 7/2012 | Yan et al. | |
| 2013/0088967 | A1 | 4/2013 | Kusumoto | |
| 2013/0223444 | A1* | 8/2013 | Liljenstolpe | H04L 61/103 370/392 |
| 2014/0281390 | A1* | 9/2014 | Boland | G06F 15/7825 712/207 |

FOREIGN PATENT DOCUMENTS

| | | | |
|---|---|---|---|
| JP | 2011166384 A | * | 8/2011 |
| JP | 2013-504959 A | | 2/2013 |
| WO | 2011/155510 A1 | | 12/2011 |
| WO | 2012/096131 A1 | | 7/2012 |

OTHER PUBLICATIONS

"Open Networking Foundation", retrieved on Nov. 6, 2015, [online] <http://www.opennetworking.org/>.

Open Networking Foundation, "OpenFlow Switch Specification", searched on Aug. 12, 2013, pp. 1-128, Version 1.3.1 (Wire Protocol 0x04), [online] <https://www.opennetworking.org/images/stories/downloads/sdn-resources/onf-specifications/openflow/openflow-spec-v1.3.1.pdf>.

"OpenFlow Switch Specification", Dec. 31, 2009, pp. 1-42, Version 1.0.0 (Wire Protocol 0x01), [online] <https://www.opennetworking.org/images/stories/downloads/sdn-resources/onf-specifications/openflow/openflow-spec-v1.0.0.pdf>.

Open vSwitch, "Open vSwitch an Open Visual Switch", retrieved on Nov. 6, 2015, [online] <http://openvswitch.org.

T. Dierks et al., "The Transport Layer Security (TLS) Protocol", Networking Group, Aug. 2008, pp. 1-104, Version 1.2, [online] <http://tools.ietf.org/html/rfc5246>.

International Search Report of PCT/JP2014/071658 dated Oct. 7, 2014.

* cited by examiner

COMMUNICATION SYSTEM, SWITCH, CONTROLLER, ANCILLARY DATA MANAGEMENT APPARATUS, DATA FORWARDING METHOD, AND PROGRAM

CROSS REFERENCE TO RELATED APPLICATION

This application is a National Stage of International Application No. PCT/JP2014/071658, filed Aug. 19, 2014, claiming priority based on Japanese patent application No. 2013-170682 filed on Aug. 20, 2013, the contents of all of which are incorporated herein by reference in their entirety.

FIELD

The present invention relates to a communication system, switch, controller, ancillary data management apparatus, data forwarding method, and program, and particularly to a communication system, switch, controller, ancillary data management apparatus, data forwarding method, and program that forward ancillary data along with the main data.

BACKGROUND

In recent years, among computer networks (referred to as "network" hereinafter), software defined network (SDN), especially data center network, has been just started to be utilized. In an SDN, network processing is divided into the control plane (C-plane) and the data plane (D-plane), and the D-plane is controlled by the C-plane having a logically centralized control architecture.

In software defined networking, there is OpenFlow, a system to control the D-plane. In OpenFlow, an OpenFlow controller (OFC) and an OpenFlow switch (OFS) are defined as the C-plane and the D-plane, respectively, and so are control messages between the OFC and the OFS, the functions of the OFS, and the API. The specifications of OpenFlow are described in detail in Non-Patent Literatures 1, 2, and 3.

FIG. 21 is a drawing showing a data center network architecture X1 configured using OpenFlow. Servers X10a and X10b are connected to edge OpenFlow switches X12a and X12b. At least one core OpenFlow switch X14 is provided in order to connect the edge OpenFlow switches X12a and X12b to each other. An OpenFlow controller X16 that controls these switches is connected using network management links X20. The network management link X20 is called "secure channel," and it is recommended that it be encrypted using SSL (Secure Socket Layer). Note that, however, whether or not the secure channel is encrypted is up to the discretion of the network operator. Further, the servers X10a and X10b are lumped together and referred to as the server 10 hereinafter when there is no need to distinguish between them. Similarly, the edge OpenFlow switches X12a and X12b are referred to as the OpenFlow switch X12.

FIG. 22 is a drawing showing a general configuration of the OpenFlow controller X16. In general, the OpenFlow controller X16 is realized as a software application running on a server. More specifically, it is realized as an application program running on an OS (Operating System) such as Linux (registered trademark).

With reference to FIG. 22, the OpenFlow controller X16 comprises a packet input/output module X164, a decryption module X166, an encryption module X168, and an OpenFlow message control module X170.

The packet input/output module X164 is generally constituted by a protocol stack constituted by TCP/IP (Transmission Control Protocol/Internet Protocol), etc., and an application interface such as a socket API (Application Programming Interface).

The decryption module X166 and the encryption module X168 are modules that decrypt and encrypt, respectively, the data portion of a packet flowing through the network management link X20. In OpenFlow, when encrypted communication is performed using the network management link X20, SSL (Secure Socket Layer) is used to encrypt the payload of a TCP (Transmission Control Protocol) packet. Therefore, in the OSI (Open Systems Interconnection) reference model, these processes are included in the session layer, a layer above the transport layer. Refer to Non-Patent Literature 5 for the details of SSL.

The decryption module X166 decrypts an OpenFlow message received from the packet input/output module X164 and hands the decrypted message to the OpenFlow message control module X170.

The encryption module X168 encrypts an OpenFlow message received from the OpenFlow message control module X170 and hands the encrypted message to the packet input/output module X164.

The OpenFlow message control module X170 is a module that controls the transmission/reception of messages to/from the OpenFlow switch X12. Various types of control messages are defined in OpenFlow, and the OpenFlow message control module X170 constructs a message to be transmitted and analyzes a received message. The control messages will be described more later.

FIG. 23 is a drawing showing a general configuration of the OpenFlow switch X12. The OpenFlow switch X12 comprises a packet input module X1200, a packet forwarding processing module X1210, a flow table X1220, an OpenFlow message processing module X1230, a secure channel control module X1240, and a packet output module X1250.

The packet input module X1200 is a module that receives a packet from the outside of the OpenFlow switch X12, and the packet output module X1250 is a module that outputs a packet externally from the OpenFlow switch 12. In reality, these modules correspond to ports of a hardware switch.

The packet forwarding processing module X1210 refers to the flow table X1220 using packet header information of a packet received from the packet input module X1200 to determine the processing (action) on the packet. Processing examples performed by the packet forwarding processing module X1210 include rewriting a packet header, outputting a packet to a designated port, and forwarding a packet to the OpenFlow controller X16. Further, sending an inquiry to the OpenFlow controller X16 is an example of processing performed by the packet forwarding processing module X1210 when no corresponding processing is found in the flow table X1220. When sending an inquiry to the OpenFlow controller X16, the packet forwarding processing module X1210 sends a inquiry request to the OpenFlow message processing module X1230 along with packet information.

The OpenFlow message processing module X1230 is a module that processes a message used in the OpenFlow protocol and performs processing such as constructing an OpenFlow message according to a request from the packet forwarding processing module X1210 or interpreting an OpenFlow message received from the OpenFlow controller X16. According to Non-Patent Literature 2, default OpenFlow messages can be broadly divided into asynchronous messages, controller-to-switch messages, and symmetric messages. Refer to Non-Patent Literatures 2 and 3 for the details of each message.

The secure channel control module X1240 is a module that controls a packet flowing through the network management link X20 between the OpenFlow controller X16 and the OpenFlow switch X12. For instance, the secure channel control module X1240 performs processing such as forwarding an OpenFlow message to the OpenFlow controller X16 and forwarding an OpenFlow message received from the OpenFlow controller X16 to the OpenFlow message processing module X1230 according to a request from the OpenFlow message processing module X1230. Further, when encrypting a packet flowing through the switch management link X20, the secure channel control module X1240 also executes encryption and decryption processing.

Until recently, OFSs has been mainly realized by hardware switch products, however, due to the expansion of the server virtualization technology, a virtual switch (vSwitch) used for forwarding packets between virtual machines (VM) within a server or between a virtual machine and an external network has started to support OpenFlow. An example of this is the Open vSwitch described in Non-Patent Literature 4. Therefore, the range of networks controllable by SDN has started to include a network of VMs within a server.

FIG. 24 is a drawing showing a server virtualization environment and a virtual switch constructed in the server X10. With reference to FIG. 24, a virtual switch X120 is implemented inside a virtual machine monitor (VMM) X100. Virtual machines X110 communicate with each other via the virtual switch X120. The packet input module X1200 and the packet output module X1250 shown in FIG. 23 correspond to a link between a VM and the virtual switch X120 and to an Ethernet (registered trademark) port provided in the server X10.

FIG. 25 is a drawing showing a data center network architecture X2 that includes the virtual switch X120 within the server X10. Note that, in FIG. 25, the virtual machine X110 and the virtual switch X120 are referred to as the virtual machines X110a and X110b, and the virtual switch X120a and X120b, respectively, corresponding to the edge OpenFlow switch X12. With reference to FIG. 25, the virtual switch X120 and the OpenFlow controller X16 are connected by the network management link X20 as well, and the OpenFlow controller is able to control the virtual switch X120.

In OpenFlow, the OpenFlow switch X12 processes a packet according to the flow table X1220 provided therein. In the flow table X1220, entries associating a matching rule defined in the header information included in a packet header with an output destination port of the packet and processing (Instruction) on the packet header are registered as flow entries. The OpenFlow switch X12 sends an inquiry to the OpenFlow controller X16 via the network management link X20 about a packet not registered in the flow table and unprocessable by the OpenFlow switch X12. This inquiry is called packet_in. In addition to these inquiries, a packet_in occurs when the OpenFlow controller X16 is designated as the output destination of a packet.

The OpenFlow switch X12 forwards a message in the form of a packet_in message to the OpenFlow controller X16 according to the OpenFlow specification. FIG. 26 shows an outline of a packet_in message X200. The packet_in message X200 includes an OpenFlow header X210, which is a header dedicated to OpenFlow, a packet_in message header X220, and packet data X230, which is the packet that started the packet_in message. In OpenFlow, a case where the entire packet (Ethernet frame) is used as the packet data X230 and a case where a portion of the packet is used are defined. In the latter, the OpenFlow switch X12 internally buffers the packet and writes a buffer ID indicating where the packet is stored to a buffer ID field provided in the packet_in message header X220. Further, when the OpenFlow switch X12 does not have any packet buffered, the buffer ID field has a value indicating an invalid buffer written therein.

Other pieces of information included in the packet_in message header X220 include fields indicating the length of the packet data X230 and the reason for starting the packet_in message.

Upon receiving the packet_in message X200, the OpenFlow controller X16 determines what processing will be performed on the packet that has started the packet_in message. If necessary, the OpenFlow controller X16 instructs the OpenFlow switch X12 to add a flow entry using a flow_mod message or forward the packet using a packet_out message. Adding a flow entry using a flow_mod message will enable the OpenFlow switch X12 to perform data plane processing on a packet having the same information without sending an inquiry to the OpenFlow controller X16 thereafter.

FIG. 27 shows an outline of a packet_out message X250. Like the packet_in message X200, the packet_out message X250 includes the OpenFlow header X210, which is a header dedicated to OpenFlow, a packet_out message header X225, and the packet data X230, which is the data of the packet that the OpenFlow controller X16 wants the OpenFlow switch X12 to forward to its destination.

The packet_out message header X225 includes a field indicating a list of processing (actions) performed by the OpenFlow switch X12, in addition to a field specifying a buffer ID.

By specifying the buffer ID included in the corresponding packet_in message X200 in the packet_out message X250, the OpenFlow controller X16 is able to instruct packet data buffered in the OpenFlow switch X12 to be forwarded without having the packet data forwarded to the OpenFlow switch X12. Upon receiving the packet_out message X250, the OpenFlow switch X12 reads out the packet from the buffer and processes the packet according to the packet_out message X250. Further, when the packet data X230 of the packet_out message X250 is valid data, the buffer ID field of the packet_out message header X225 has a value indicating an invalid buffer written therein.

The operation related to packet_in and packet_out is the same for vSwitch that supports OpenFlow. At the same time, vSwitch differs from the conventional OpenFlow switch X12 in that it is a software program within a server and that it is generally utilized while being incorporated in server virtualization software and an OS. In other words, the format of processed data is not that of packets or frames flowing through a network, but it is the data format utilized within a server such as the socket buffer structure. As a result, in addition to data incorporated in a packet as header information, data utilized in processing within a server can be held. Such data that accompanies a packet is referred to as ancillary data.

Examples of ancillary data include data written to a control buffer (CB) region included in the Linux socket buffer structure. Other examples of ancillary data are tenant information in a multi-tenant data center and tunnel information for network tunneling.

Patent Literature 1 discloses a configuration in which proactive-type packet forwarding is performed by having an edge OpenFlow switch of an OpenFlow network convert a packet header, having a core OpenFlow switch forward a packet using the converted packet header as a matching condition, and then having an edge OpenFlow switch connected to a receiving station restore the packet header.
Patent Literature 1:
International Publication Number WO2012/096131 (A1)
Non-Patent Literature 1:
"Open Networking Foundation," [online], [searched on Aug. 12, 2013], the Internet <http://www.opennetworking.org/>
Non-Patent Literature 2:
"OpenFlow Switch Specification" Version 1.3.1 (Wire Protocol 0x04), [online], [search on Aug. 12, 2013], the Internet <https://www.opennetworking.org/images/stories/downloads/sdn-resources/onf-specifications/openflow/openflow-spec-v1.3.1.pdf>
Non-Patent Literature 3:
"OpenFlow Switch Specification" Version 1.0.0 (Wire Protocol 0x01), [online], [search on Aug. 12, 2013], the Internet <https://www.opennetworking.org/images/stories/downloads/sdn-resources/onf-specifications/openflow/openflow-spec-v1.0.0.pdf>
Non-Patent Literature 4:
"Open vSwitch An Open Virtual Switch," [online], [search on Aug. 12, 2013], the Internet <http://openvswitch.org/>
Non-Patent Literature 5:
"The Transport Layer Security (TLS) Protocol Version 1.2," [online], [search on Aug. 12, 2013], the Internet <http://tools.ietf.org/html/rfc5246>

SUMMARY

The entire disclosures of the above mentioned Patent Literatures and Non-Patent Literatures are incorporated herein by reference thereto. The following analysis is given by the present invention. A first problem with the communication system described in Background is that, when vSwitch that supports OpenFlow sends packet_in and packet_out messages like the OpenFlow switch X12 does, the packet may not be properly forwarded since ancillary data is not included in the packet_out message.

The reason for this is the structure of the packet_in message X200 defined in the OpenFlow specification. Data flowing through a network such as a packet, i.e., an Ethernet frame, can be included in the packet_in message X200, but other pieces of information cannot be included therein.

As shown in FIG. 26, the packet_in message X200 is constituted by the OpenFlow header X210, the packet_in message header X220, and the packet data X230. The OpenFlow header X210 and the packet_in message header X220 include information indicating the message type and the packet length, but information about ancillary data cannot be held. Further, since the packet data X230 does not include ancillary data, neither does the packet_in message X200 as a result. Just as the packet_in message X200 does not include ancillary data, the packet_out message X250 does not include ancillary data, either (refer to FIG. 27).

In the communication system described in Background, when ancillary data is buffered by the OpenFlow switch X12 and a packet_in message is sent, the OpenFlow controller X16 may be able to instruct only the OpenFlow switch X12 that has sent the packet_in message to send a packet_out message in response to this packet_in message.

Such a constraint poses a problem to the packet forwarding method described in Patent Literature 1 in which an edge OpenFlow switch (for instance X12a in FIG. 21) connected to a transmitting station in a communication path between two communicating stations converts a packet header, a core OpenFlow switch (for instance X14 in FIG. 21) forwards it using the converted packet header, and then an edge OpenFlow switch (for instance X12b in FIG. 21) connected to a receiving station restores the packet header.

When the forwarding method of Patent Literature 1 is employed, the OpenFlow controller X16 needs to create a packet_out message X250 that outputs a packet having a packet header that can pass through the core OpenFlow switch at the time of sending the packet_out message. In this case, the load on the OpenFlow controller X16 increases and an increase in the load on the controller may impact the network control greatly in a centralized control architecture such as SDN.

Therefore, there is a need in the art to provide a communication system, switch, controller, ancillary data management apparatus, data forwarding method, and program enabling ancillary data to be forwarded in a centralized control network represented by OpenFlow described above without being constrained by forwarding methods.

According to a first aspect, there is provided a communication system, comprising: a first network switch that transmits to a network controller a control message containing ancillary data; the network controller that retrieves the ancillary data from the control message containing the ancillary data, holds the ancillary data, and transmits to a second network switch a control message containing the ancillary data; and the second network switch that receives the control message containing the ancillary data from the network controller, retrieves a packet to be outputted and the ancillary data, and forwards the packet and the ancillary data to a specified destination.

According to a second aspect, there are provided a network switch, network controller, and ancillary data management apparatus capable of constituting the communication system described above.

According to a third aspect, there is provided a data forwarding method, comprising: by a first network switch, transmitting to a network controller a control message containing ancillary data; by the network controller, retrieving the ancillary data from the control message containing the ancillary data and hold the ancillary data; by the network controller, transmitting to a second network switch a control message containing the ancillary data; and by the second network switch, receiving the control message containing the ancillary data from the network controller, retrieving a packet to be outputted and the ancillary data, and forwarding the packet and the ancillary data to a specified destination. The present method is tied to particular machines, which are apparatuses that constitute a centralized control network.

According to a fourth aspect, there is provided a program causing a computer, arranged on a network controller that receives a control message containing ancillary data from a first network switch, to execute: retrieving the ancillary data from the control message containing the ancillary data and holding the ancillary data; and transmitting to a second network switch a control message, to which the ancillary data is added. Further, this program can be stored in a computer-readable (non-transient) storage medium. In other words, the present invention can be realized as a computer program product.

The present invention provides the following advantage, but not restricted thereto. According to the present invention, it becomes possible to add to a centralized control network represented by OpenFlow an ancillary data forwarding function having few constraints imposed by forwarding schemes.

PREFERRED MODES

Figure 1:
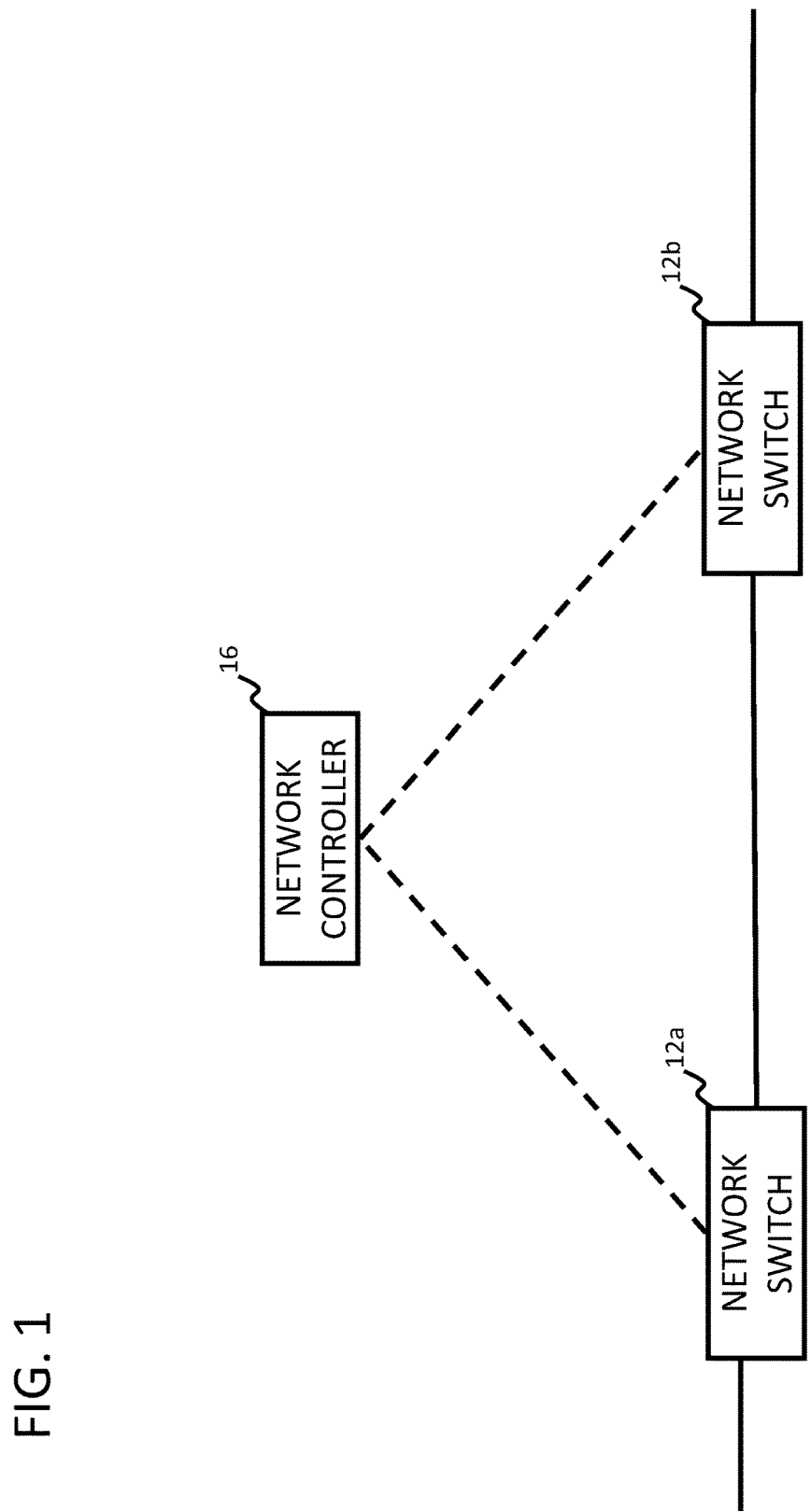
FIG. 1 is a drawing showing a configuration of a communication system of a first exemplary embodiment of the present invention.

In the present disclosure, there are various possible modes, which include the following, but not restricted thereto. First, a summary of an exemplary embodiment will be given with reference to the drawings. Note that drawing reference signs in the summary are given to each element as an example solely to facilitate understanding for convenience and are not intended to limit the present invention to the modes shown in the drawings. Further, the fact that the data unit forwarded in a network is uniformly referred to as "packet" in the description below is not intended to limit the types of networks to which the present invention can be applied.

Further, OpenFlow is used in the description of exemplary embodiments below, however, this is to facilitate understanding and is not intended to limit the present invention to network switches and network controllers supporting OpenFlow. In addition to OpenFlow, the present invention can be applied to a network scheme in which a network controller and a network switch exchange control messages to determine what processing is performed on a packet. Further, when the OpenFlow specification is referred to, Version 1.0.0 of Non-Patent Literature 3 is used, however, this is not intended to limit the version of OpenFlow to which the present invention is applied.

A series of packets grouped in packet header information will be referred to as "flow" hereinafter. For instance, packets having the same destination MAC address and VLAN ID are grouped together and a series of packets belonging to this group will be referred to as "flow."

First Exemplary Embodiment

First, a first exemplary embodiment of the present invention will be described in detail with reference to the drawings. FIG. 1 is a drawing showing a schematic configuration of a communication system of the first exemplary embodiment of the present invention. FIG. 1 shows two network switches 12a and 12b, and an OpenFlow controller 16 that controls these network switches 12a and 12b.

How ancillary data is transmitted in this configuration will be described. First, the first network switch 12a transmits a control message (for instance a packet_in message described above) containing ancillary data to the OpenFlow controller 16. The OpenFlow controller 16 retrieves the ancillary data from the control message containing the ancillary data and holds the ancillary data.

Having received the packet_in message, the OpenFlow controller 16 transmits a control message (for instance the packet_out message) containing the ancillary data to the second network switch 12b. Upon receiving the control message containing the ancillary data from the network controller, the second network switch 12b retrieves a packet to be outputted and the ancillary data, and forwards them to a specified destination.

As described, it becomes possible to add to a centralized control network an ancillary data forwarding function having few constraints imposed by forwarding methods. Further, the network switches 12a and 12b are directly connected in the example of FIG. 1, however, a core network switch may exist between the network switches 12a and 12b. As for the control message, a pair of packet_in and packet_out messages is typical, however, a unique message defined by a vendor as described by Non-Patent Literatures 2 and 3 can also be used.

Next, a detailed configuration of each apparatus for achieving the function above will be described in detail with reference to the drawings. Note that the network switches 12a and 12b will be referred to as the network switch 12 in the description below when there is no need to distinguish between them.

Figure 2:
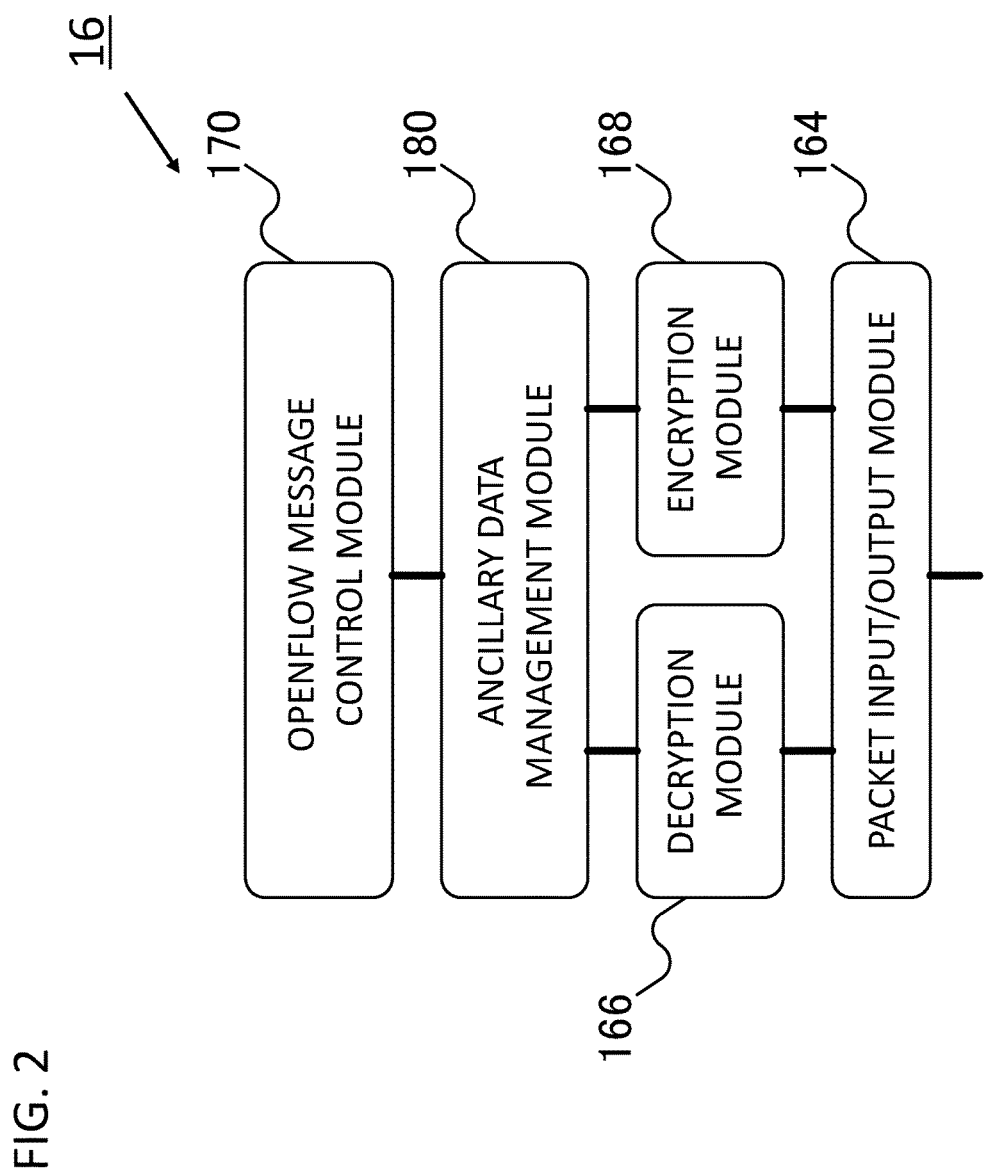
FIG. 2 is a drawing showing a configuration of a network controller of the first exemplary embodiment of the present invention.
Figure 22:
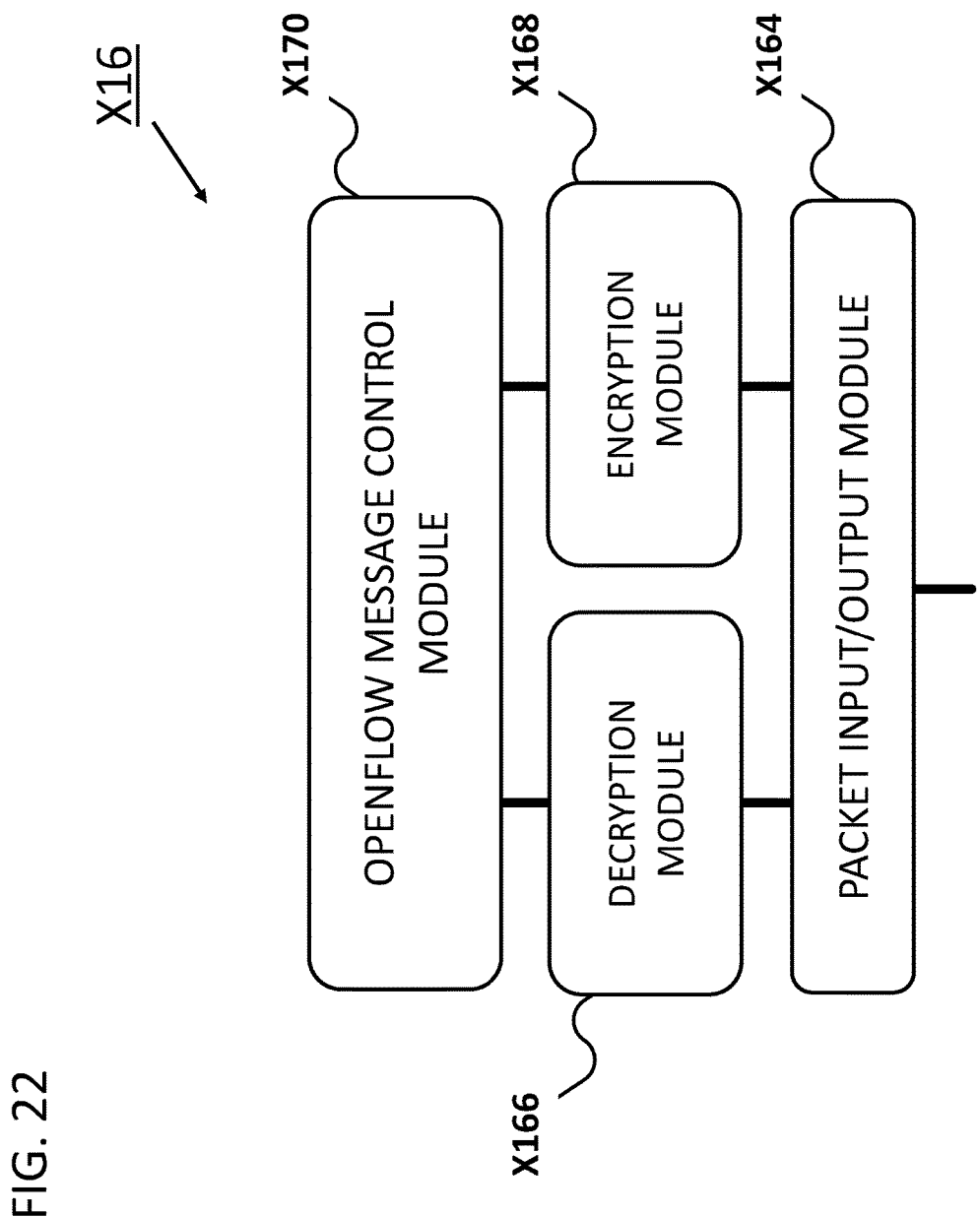
FIG. 22 is a drawing showing a general configuration of an OpenFlow controller.

FIG. 2 is a drawing showing a configuration of the OpenFlow controller 16 of the first exemplary embodiment of the present invention. FIG. 2 shows a configuration comprising a packet input/output module 164, a decryption module 166, an encryption module 168, an ancillary data management module 180, and an OpenFlow message control module 170. Since the packet input/output module 164, the decryption module 166, the encryption module 168, and the OpenFlow message control module 170 are the same as the elements X164, X166, X168, and X170 of the OpenFlow controller described using FIG. 22, the explanation will be omitted.

The ancillary data management module 180 is a module that separates ancillary data 240 from a packet_in message 200 (FIG. 28) with the ancillary data received from the decryption module 166, and holds the data. Further, the ancillary data management module 180 adds appropriate ancillary data 240 to a packet_out message 250 received from the OpenFlow message control module 170, and outputs the packet_out message 250 (FIG. 29) with the ancillary data to the encryption module 168.

Figure 3:
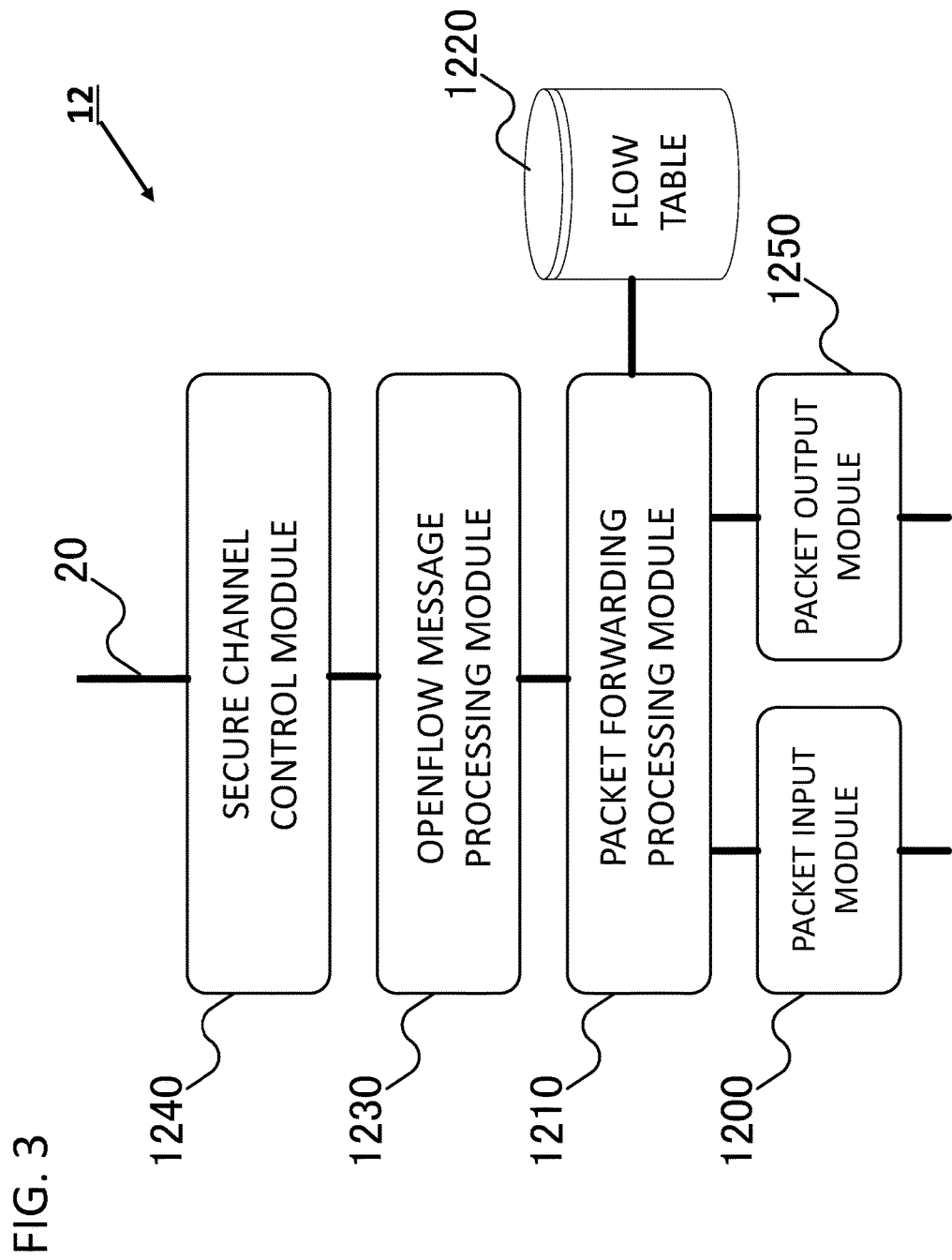
FIG. 3 is a drawing showing a configuration of a network switch of the first exemplary embodiment of the present invention.
Figure 23:
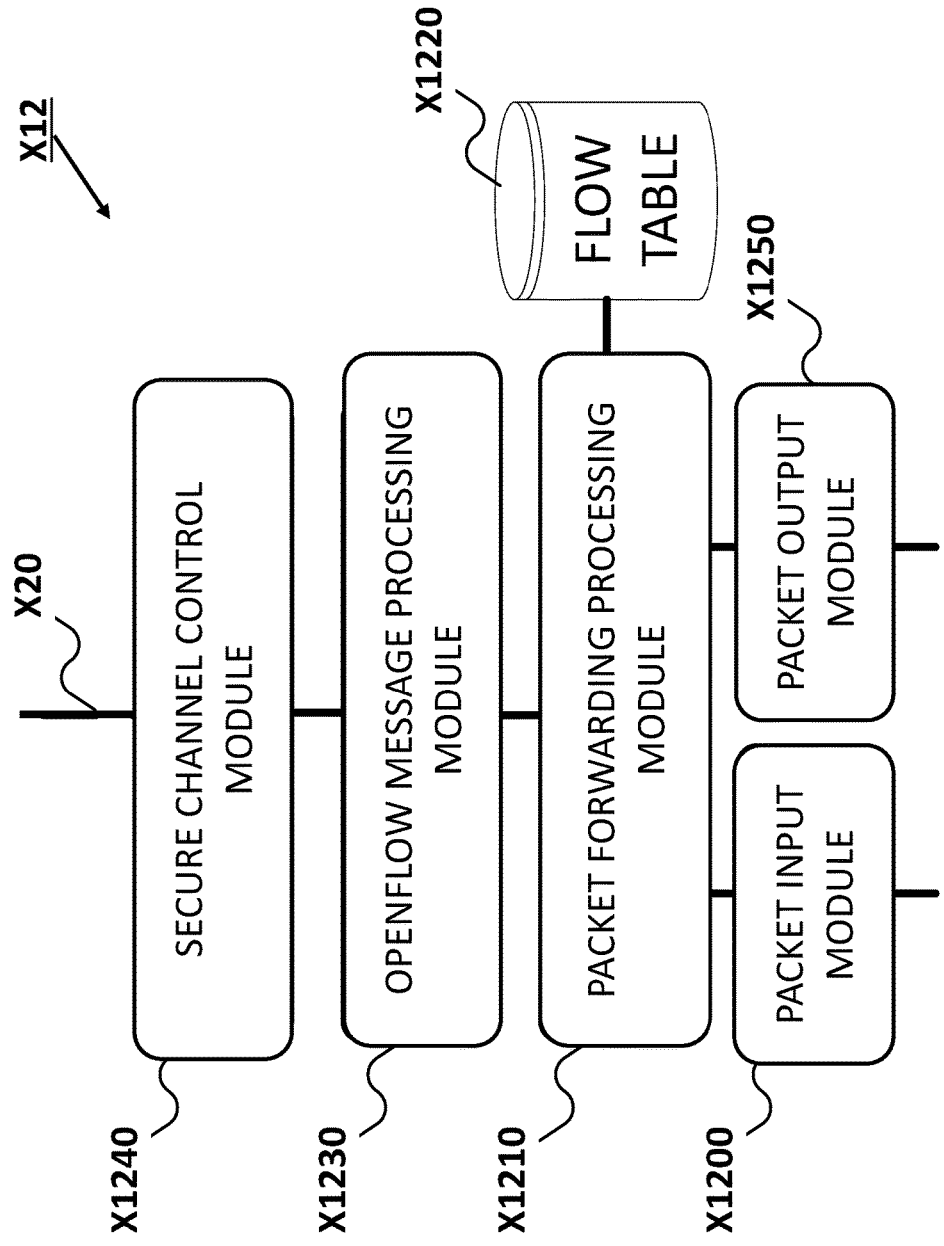
FIG. 23 is a drawing showing a general configuration of an OpenFlow switch.
Figure 24:
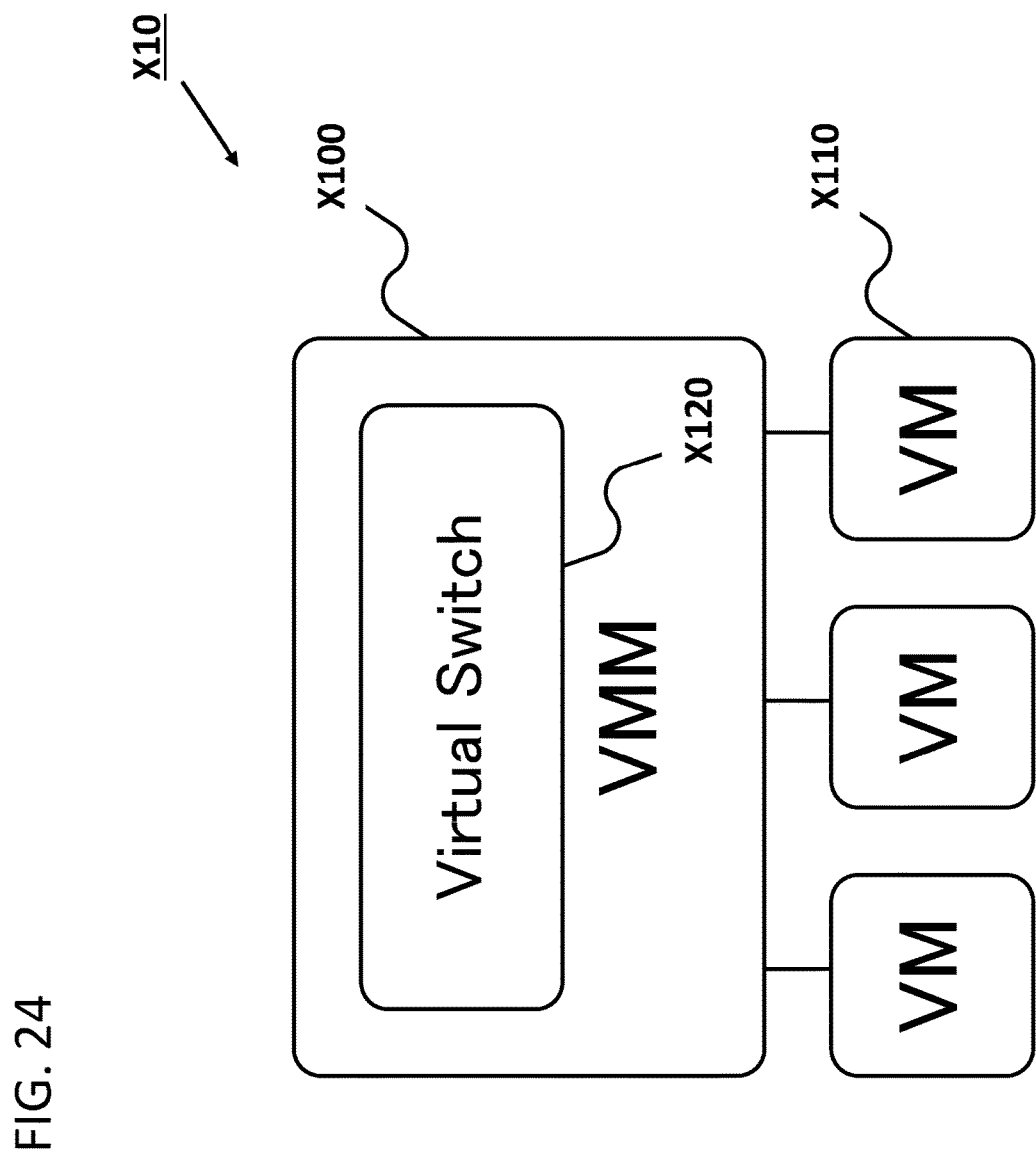
FIG. 24 is a drawing showing a server virtualization environment and a virtual switch constructed in a server.
Figure 25:
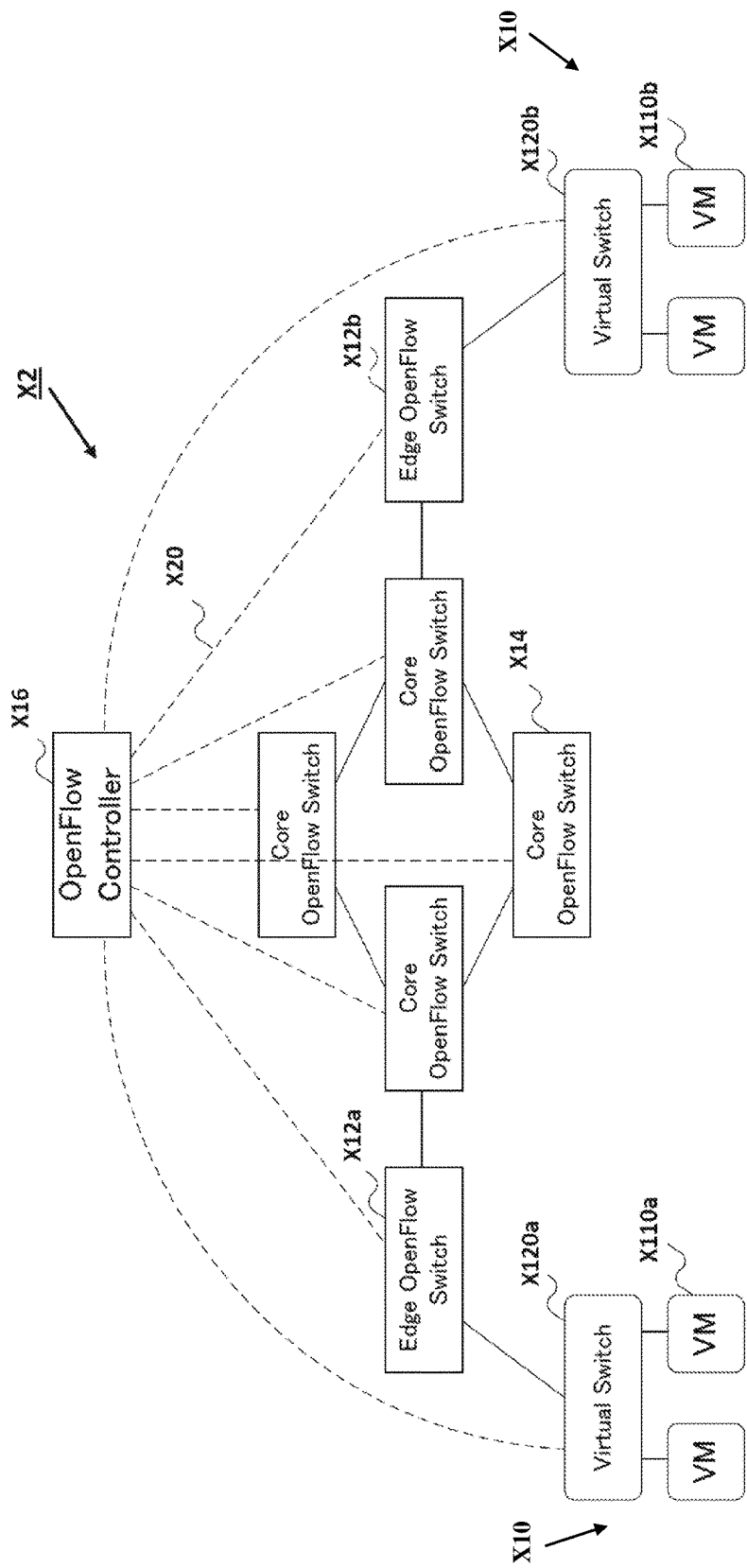
FIG. 25 is a drawing showing a data center network architecture that includes a virtual switch in a server.

FIG. 3 is a drawing showing a configuration of the network switch 12 of the first exemplary embodiment of the present invention. FIG. 3 shows a configuration comprising a packet input module 1200, a packet forwarding processing module 1210, a flow table 1220, an OpenFlow message processing module 1230, a secure channel control module 1240, and a packet output module 1250. This configuration differs from the OpenFlow switch described using FIG. 23 in that changes have been made to the OpenFlow message processing module 1230.

Figure 4:
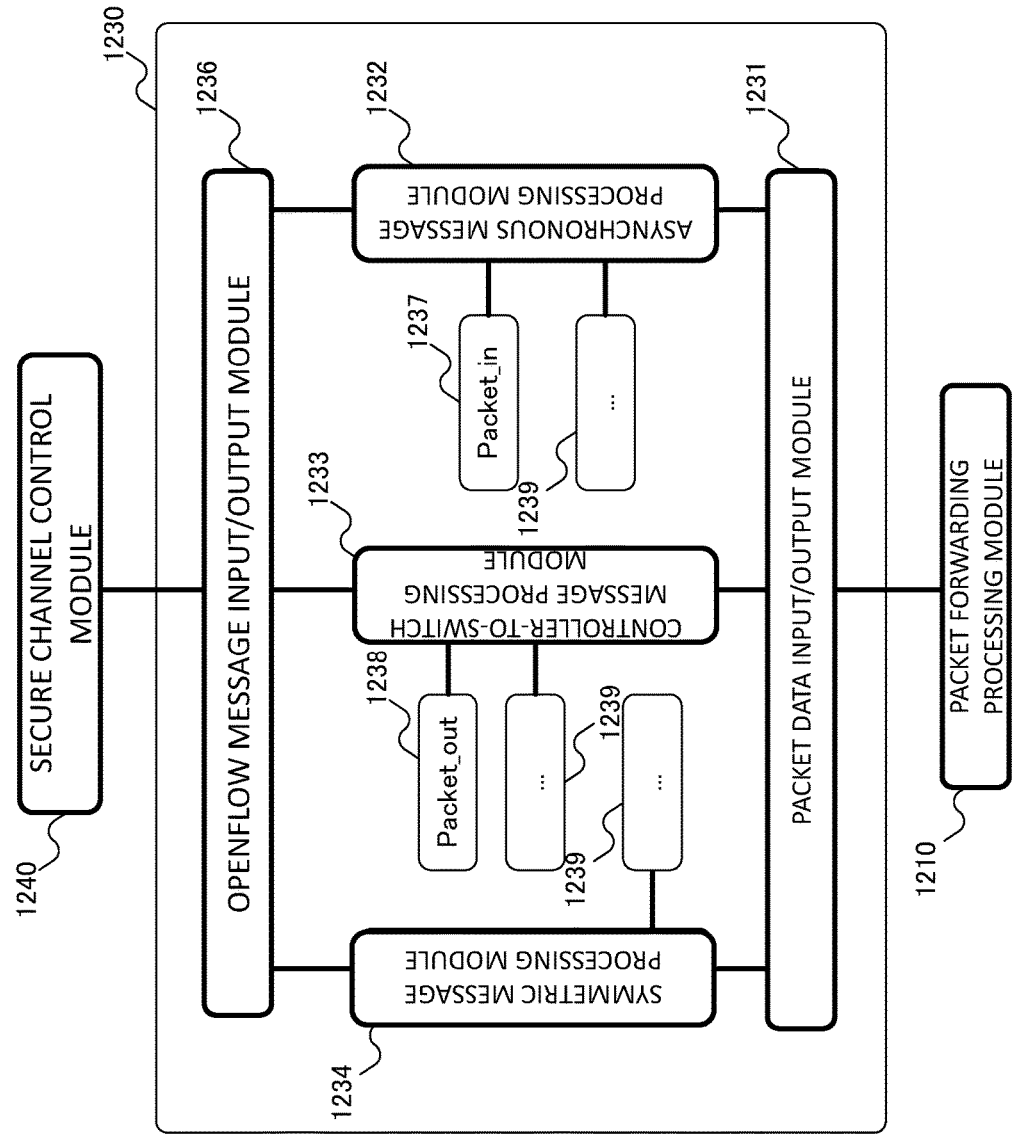
FIG. 4 is a drawing showing a detailed configuration of an OpenFlow message processing module of the network switch of the first exemplary embodiment of the present invention.

FIG. 4 is a drawing showing a detailed configuration of the OpenFlow message processing module 1230 of the network switch 12 of the first exemplary embodiment of the present invention. FIG. 4 shows a configuration comprising a packet data input/output module 1231, an asynchronous message processing module 1232, a controller-to-switch message processing module 1233, a symmetric message processing module 1234, an OpenFlow message input/output module 1236, a packet_in message processing module 1237, and a packet_out message processing module 1238.

Further, FIG. 4 does not show any module that processes an OpenFlow message other than the packet_in message 200 and the packet_out message 250, however, an individual message processing module 1239 is provided for each of the asynchronous message processing module 1232, the controller-to-switch message processing module 1233, and the symmetric message processing module 1234 according to the type of each message.

In the present exemplary embodiment, when requesting the OpenFlow message processing module 1230 to send the packet_in message 200, the packet forwarding processing module 1210 hands ancillary data in addition to packet configuration data. This can be achieved by handing all the data stored, for instance, in the socket buffer to the OpenFlow message processing module 1230.

The packet data input/output module 1231 exchanges data with the packet forwarding processing module 1210, and exchanges data and message processing requests with the asynchronous message processing module 1232, the controller-to-switch message processing module 1233, and the symmetric message processing module 1234. These processing requests include at least an identifier indicating the message type. For instance, when receiving a request to transmit a packet_in message 200 from the packet forwarding processing module 1210, the packet data input/output module 1231 forwards the request, packet configuration data, and ancillary data to the asynchronous message processing module 1232.

When a packet is outputted after a packet_out message 250 from the OpenFlow controller 16 has been processed, the controller-to-switch message processing module 1233 forwards packet configuration data and ancillary data to the packet data input/output module 1231.

The asynchronous message processing module 1232 processes asynchronous messages among OpenFlow messages. The packet_in message 200 is an example of an asynchronous message. When receiving asynchronous message data and a request to process the data from the packet data input/output module 1231, the asynchronous message processing module 1232 forwards the data to be processed along with the message processing request to an appropriate message processing module (the packet_in message processing module 1237 or the individual message processing module 1239) depending on the type of the message to be processed.

The packet_in message processing module 1237 or the individual message processing module 1239 connected to the asynchronous message processing module 1232 constructs a message to be forwarded to the OpenFlow controller 16. The asynchronous message processing module 1232 forwards the constructed message to the OpenFlow message input/output module 1236 and issues a message forwarding request to the OpenFlow controller 16.

The controller-to-switch message processing module 1233 processes controller messages among OpenFlow messages. The packet_out message 250 is an example of a controller message. When receiving a controller message and a request to process the message from the OpenFlow message input/output module 1236 (described later), the controller-to-switch message processing module 1233 forwards the data to be processed along with the message processing request to an appropriate message processing module (the packet_out message processing module 1238 or the individual message processing module 1239) depending on the type of the message to be processed.

The packet_out message processing module 1238 performs processing such as retrieving an Ethernet frame on the basis of the data of a packet_out message received from the controller-to-switch message processing module 1233, and shapes the packet_out message 250 so that the packet forwarding processing module 1210 is able to handle it. The shaped packet_out message 250 is forwarded to the controller-to-switch message processing module 1233.

Controller messages include messages for controlling and configuring the OpenFlow switch 12, in addition to the packet_out message 250, and these messages are processed by each individual message processing module 1239 connected to the controller-to-switch message processing module 1233.

The symmetric message processing module 1234 processes symmetric messages among OpenFlow messages. The symmetric messages include messages defined by a user, in addition to messages defined in OpenFlow. When receiving symmetric message data and a request to process the data from the packet data input/output module 1231 or the OpenFlow message input/output module 1236, the symmetric message processing module 1234 forwards the data to be processed along with the message processing request to an appropriate individual message processing module 1239 depending on the type of the message to be processed.

The OpenFlow message input/output module 1236 exchanges data with the secure channel control module 1240 (described later). Further, the OpenFlow message input/output module 1236 receives a message to be forwarded to the OpenFlow controller 16 and a request to forward the message from the asynchronous message processing module 1232. Further, the OpenFlow message input/output module 1236 forwards an OpenFlow message to the controller-to-switch message processing module 1233 and the symmetric message processing module 1234. Further, the OpenFlow message input/output module 1236 receives a message to be forwarded to the OpenFlow controller 16 and a request to forward the message from the symmetric message processing module 1234. For instance, when receiving a packet_out message 250 from the secure channel control module 1240, the OpenFlow message input/output module 1236 forwards the packet_out message 250 and a request to forward the message to the controller-to-switch message processing module 1233.

The packet_in message processing module 1237 constructs a packet_in message 200 using asynchronous message data received from the asynchronous message processing module 1232. This packet_in message 200 contains the ancillary data 240. How to include the ancillary data 240 will be described later. The constructed packet_in message 200 is returned to the asynchronous message processing module 1232.

The packet_out message processing module 1238 retrieves an Ethernet frame, the ancillary data 240, and an action from a packet_out message 250 received from the controller-to-switch message processing module 1233, and shapes the message so that the packet_out message processing module 1238 can hand the message to the packet forwarding processing module 1210. For instance, the data is stored in an appropriate region of the socket buffer structure. The shaped packet_out message 250 is forwarded to the controller-to-switch message processing module 1233.

Figure 5:
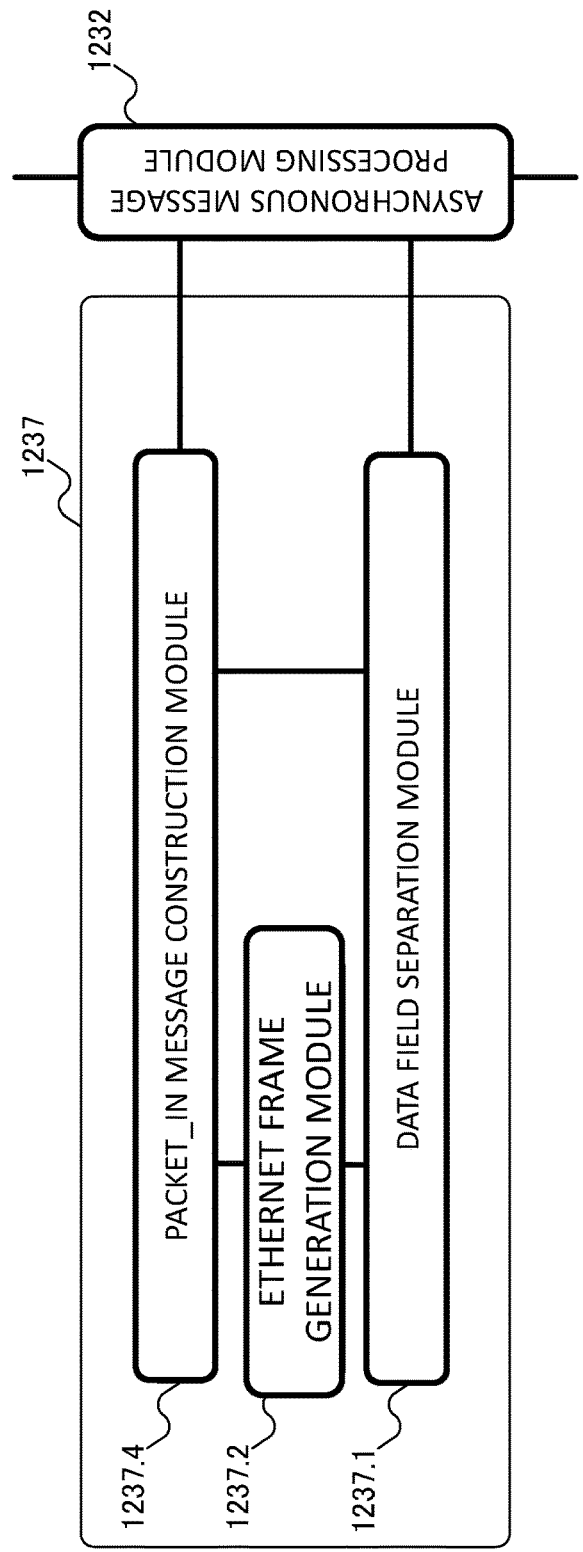
FIG. 5 is a drawing showing a configuration example of a packet_in message processing module inside the network switch of the first exemplary embodiment of the present invention.
Figure 26:
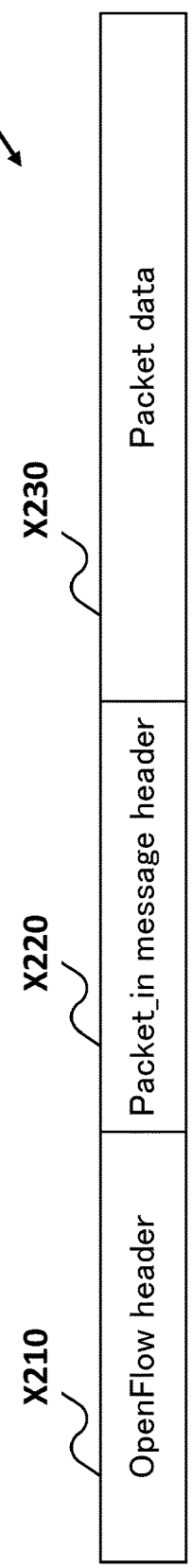
FIG. 26 is a drawing showing an outline of a packet_in message.
Figure 27:
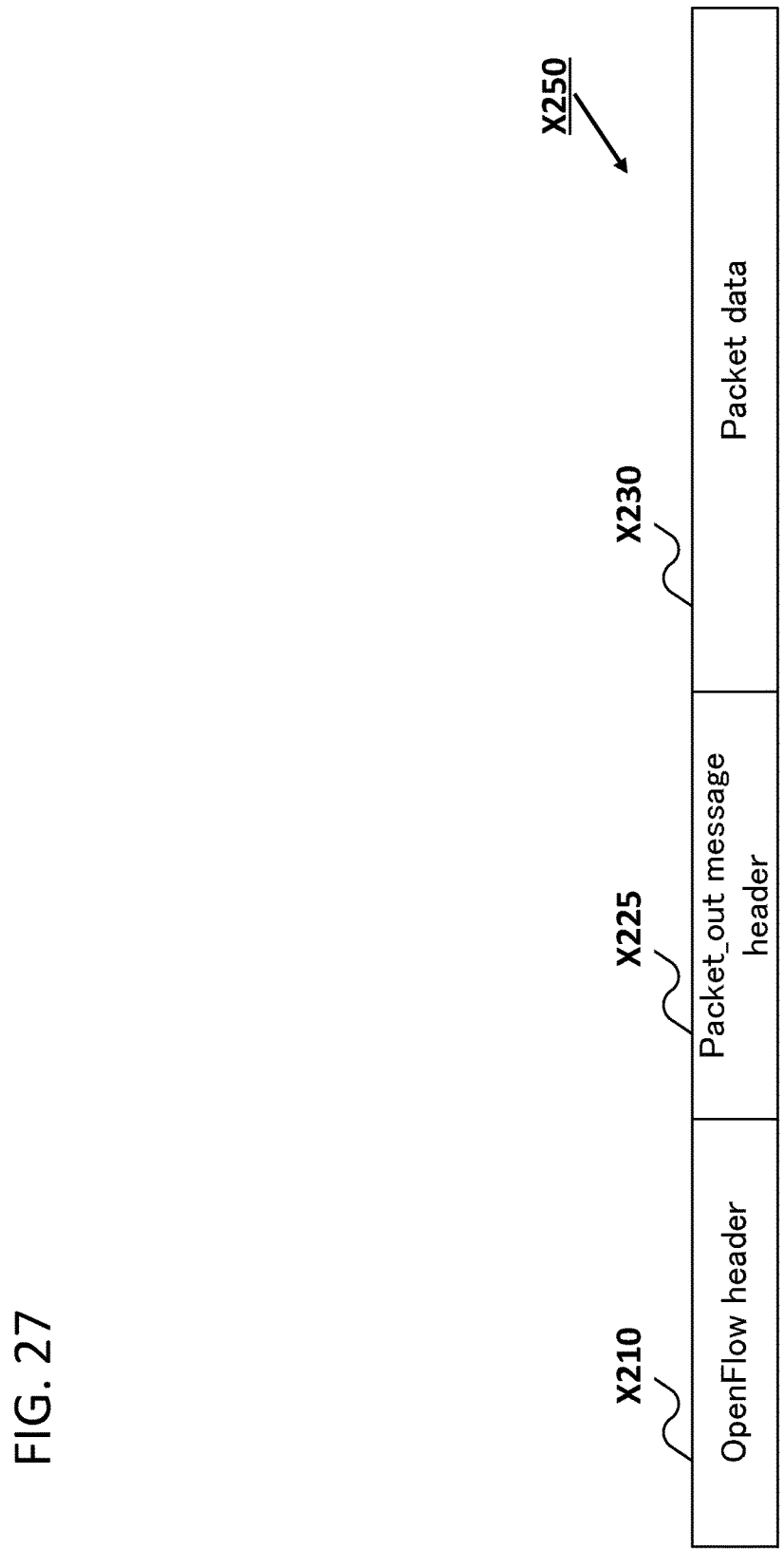
FIG. 27 is a drawing showing an outline of a packet_out message.
Figure 28:
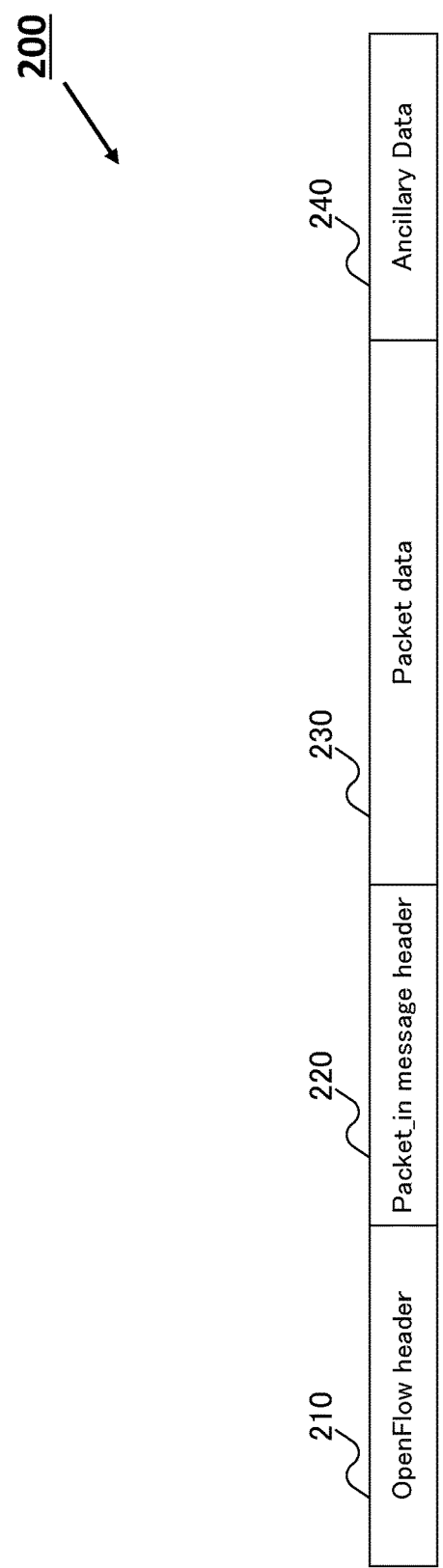
FIG. 28 is a drawing showing an outline of a packet_in message with ancillary data.

FIG. 5 is a drawing showing a configuration of the packet_in message processing module 1237 in the Open-Flow message processing module, and FIG. 28 shows a configuration example of the packet_in message 200 capable of storing ancillary data. FIG. 5 shows a configuration comprising a data field separation module 1237.1, an Ethernet frame generation module 1237.2, and a packet_in message construction module 1237.4. With reference to FIG. 28, the ancillary data 240 is added to the packet_in message X200 in FIG. 26. The same signs are given to the elements common to FIGS. 26 and 28.

The packet_in message processing module 1237 starts to construct a packet_in message 200 when receiving asynchronous message data and an asynchronous message construction request that requests the construction of a packet_in message 200 from the asynchronous message processing module 1232. Further, the act of handing asynchronous message data alone may serve as an asynchronous message construction request without explicitly issuing a construction request.

When a packet_in message 200 is constructed, the asynchronous message data includes at least information necessary for constructing a packet_in message header 220 and packet configuration data. Examples of the information necessary for constructing a packet_in message header 220 include data indicating the reason for starting a packet_in message and a buffer ID when the packet is buffered. The packet configuration data contains ancillary data, in addition to information used for the packet header and data included in the payload of the packet. Data held in the socket buffer is an example of the packet configuration data.

As shown in FIG. 28, the packet_in message 200 includes an OpenFlow header 210, and this header contains the version of OpenFlow, the message type, the message length, and a transaction ID. Since these are static values (the version and the message type) and values calculated when a message is constructed (the message length and the transaction ID), the asynchronous message processing module 1232 does not necessarily have to provide these values.

Upon receiving asynchronous message data and an asynchronous message construction request from the asynchronous message processing module 1232, the data field separation module 1237.1 divides the asynchronous message data into frame information necessary for constructing an Ethernet frame, message header information necessary for constructing a packet_in message header 220, and ancillary data. Out of the divided data, the data field separation module 1237.1 hands the frame information to the Ethernet frame generation module 1237.2 and hands the other pieces of the data to the packet_in message construction module 1237.4.

The Ethernet frame generation module 1237.2 constructs an Ethernet frame on the basis of the frame information given by the data field separation module 1237.1. The frame information contains header information such as a MAC address, an IP address, and a VLAN ID, and a frame data portion, which will become the payload. The constructed Ethernet frame is handed over to the packet_in message construction module 1237.4.

The packet_in message construction module 1237.4 constructs a packet_in message 200 from the information necessary for constructing a packet_in message header and the ancillary data 240 received from the data field separation module 1237.1 and from the Ethernet frame received from the Ethernet frame generation module 1237.2. Packet data 230 in FIG. 28 is constituted by this Ethernet frame.

The process of constructing a packet_in message 200 will be described. First, the packet_in message construction module 1237.4 appends the ancillary data 240 to the end of the Ethernet frame. At this time, padding data may be inserted between the Ethernet frame and the ancillary data 240. For instance, padding data may be inserted in order to make the address of a storage area storing the ancillary data 240 a multiple of 4 or 8. As long as padding data is inserted according to a certain rule, one will not be confused as to where the ancillary data 240 is stored by the presence of the padding data.

Next, the packet_in message construction module 1237.4 constructs a packet_in message header 220 and adds it to the beginning of the Ethernet frame. The packet_in message header 220 includes a field indicating the length of the Ethernet frame, and this value is obtained by adding the length of the Ethernet frame to the length of the ancillary data 240. Regarding other pieces of information, a value is set for each field according to Non-Patent Literature 2.

Next, the packet_in message construction module 1237.4 constructs an OpenFlow header 210 and adds it to the beginning of the packet_in message header 220. A data length including up to the ancillary data 240 is stored in the message length included in the OpenFlow header 210. As a result, the packet_in message 200 shown in FIG. 28 can be constructed. Meanwhile, a value indicating the length of the Ethernet frame included in the header of the Ethernet frame contained in the packet data 230 of the packet_in message 200 does not include the length of the ancillary data. Therefore, the storing location of the ancillary data 240 can be derived from the length value of the OpenFlow header 210, the length of the packet_in message header 220, and the value of the Ethernet frame length. More concretely, it is derived as follows.

> (The starting position of the ancillary data 240)=(the length of the OpenFlow header 210 (fixed value))+(the length of the packet_in message header 220 (fixed value))+(the header length of the Ethernet frame (fixed value))+(the value of the packet length field included in the IP header)

When the data is padded, the amount of the padding data is added to the starting position of the ancillary data 240 according to the method for inserting padding data (such as making the starting position of the ancillary data 240 a multiple of 4).

Figure 6:
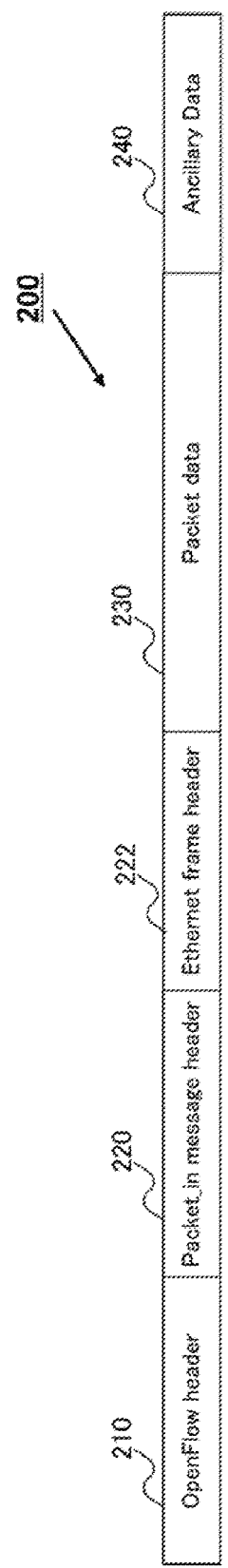
FIG. 6 is a drawing showing a configuration example of a packet_in message containing ancillary data.

There are other methods for specifying the location of the ancillary data 240. For instance, in an example of FIG. 6, an Ethernet frame header 222 is newly inserted between the packet_in message header 220 and the packet data 230. The header information used in OpenFlow in the header area of the Ethernet frame included in the packet data 230 is copied to this Ethernet frame header 222. In other words, the Ethernet frame header 222 has the same information about the IP header and the TCP header as the header of the Ethernet frame included in the packet data 230.

The length including the ancillary data 240 is set for a packet length included in an IP header portion of the Ethernet frame header 222. In other words, the Ethernet frame header 222 regards the packet data 230 and the ancillary data 240 as one Ethernet frame. The packet_in message header 220 and the OpenFlow header 210 are constructed on the basis of an Ethernet frame having the Ethernet frame header 222 as the header thereof. As a result, in addition to the length of the ancillary data 240, the length of the inserted Ethernet frame is added to the value indicating the length of the Ethernet frame and the message length of the OpenFlow header 210 in the packet_in message header 220.

With this configuration, using the number of bytes between a value indicating the length of the IP packet_in the Ethernet frame header 222 and the starting position of the IP header of the Ethernet frame included in the packet data 230 and the packet length value of the IP header portion of the Ethernet frame included in the packet data 230, where the ancillary data 240 ends from the end of the packet data 230 can be derived.

Further, when ancillary data is constituted by information added to a packet such as information used for tunneling, the data may be added to a packet before a packet_in message is sent. For instance, when ancillary data is information for constituting an outer header of a NVGRE (Network Virtualization using Generic Routing Encapsulation) tunnel only, the Ethernet frame included in the packet_in message 200 is encapsulated via NVGRE. Since the ancillary data information is embedded in the outer header, the ancillary data will not be lost before and after packet_in and packet_out messages are sent. At this time, in order to notify the OpenFlow controller 16 of how the ancillary data is embedded, for instance, the specification of OpenFlow may be extended, setting a value indicating a message having packet with ancillary data embedded for the message type included in the OpenFlow header 210.

Next, the packet_in message construction module 1237.4 forwards the constructed packet_in message 200 to the asynchronous message processing module 1232, completing the process of constructing a packet_in message 200.

The packet_in message 200 constructed as above is forwarded to the OpenFlow controller 16 via the secure channel control module 1240 and the network management link 20.

Upon receiving the packet_in message 200, the OpenFlow controller 16 holds the OpenFlow header 210, the packet_in message header 220, the Ethernet frame (packet data 230), and the ancillary data 240 included in the packet_in message 200 in an identifiable manner. For instance, they may be stored in each member of an OpenFlow message structure in the OpenFlow controller 16 as described in Non-Patent Literature 3. In this case, the ancillary data 240 may be treated as a piece of data together with the Ethernet frame within the OpenFlow controller 16, or only the ancillary data 240 may be stored in a different area. In the latter case, the ancillary data 240 must be separated from the packet_in message. Further, as described earlier, the starting position of the ancillary data 240 can be calculated from the message header information.

Next, the OpenFlow controller 16 determines the action for the packet from the header information included in the Ethernet frame.

Next, if necessary, the OpenFlow controller 16 reconstructs the Ethernet frame to be stored in the area of the packet data 230 of a packet_out message 250. For instance, in a case where an ARP (Address Resolution Protocol) packet is sent to the OpenFlow controller 16 and the OpenFlow controller 16 returns an ARP Reply packet to the server or virtual machine that sent the ARP packet_in a system in which a network is constructed using OpenFlow, the Ethernet frame included in the packet_in message 200 is an ARP packet, but the Ethernet frame included in the packet_out message 250 is an ARP Reply packet. Whether or not the reconstruction of the Ethernet frame is necessary depends on the system configuration and the management policy.

Figure 29:
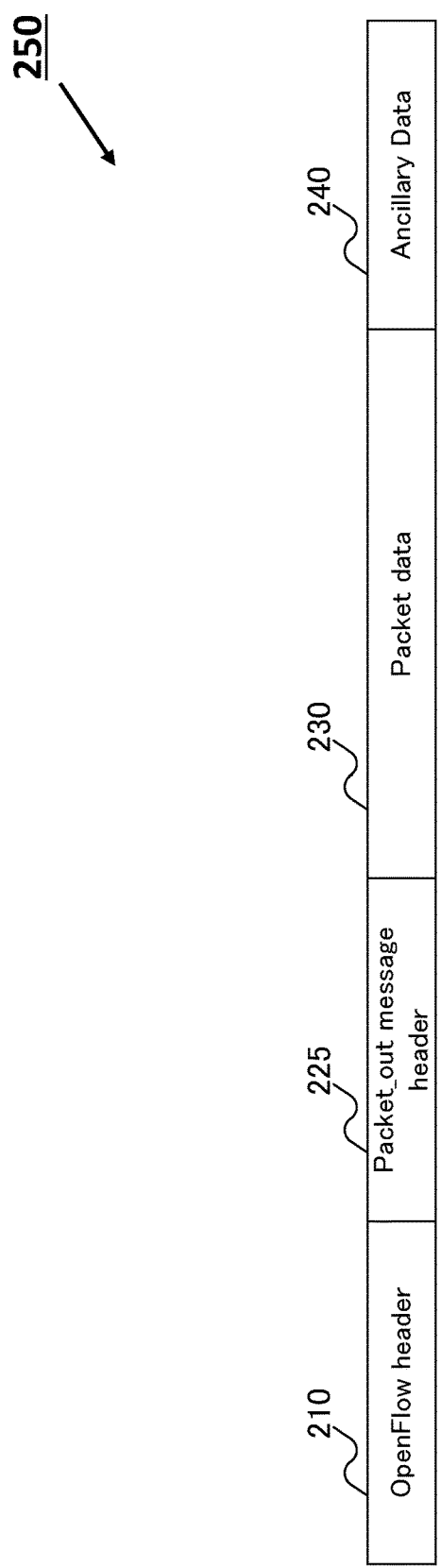
FIG. 29 is a drawing showing an outline of a packet_out message with ancillary data.

Next, the OpenFlow controller 16 constructs a packet_out message 250 shown in FIG. 29 using the information of the OpenFlow header 210, the packet_in message header 220, the constructed Ethernet frame, and the ancillary data 240, in addition to the number of actions and information about the actions. In the packet_out message 250, since a packet_out message header 225, unlike the packet_in message header 220, does not have a field indicating the length of the packet data 230, the OpenFlow controller 16 may be configured so that processing that depends on the presence of the ancillary data 240 does not occur in the case where the ancillary data 240 is treated as a piece of data together with the Ethernet frame within the OpenFlow controller 16.

The OpenFlow controller 16 sends the constructed packet_out message 250 to an appropriate OpenFlow switch 12 via the network management link 20.

Figure 7:
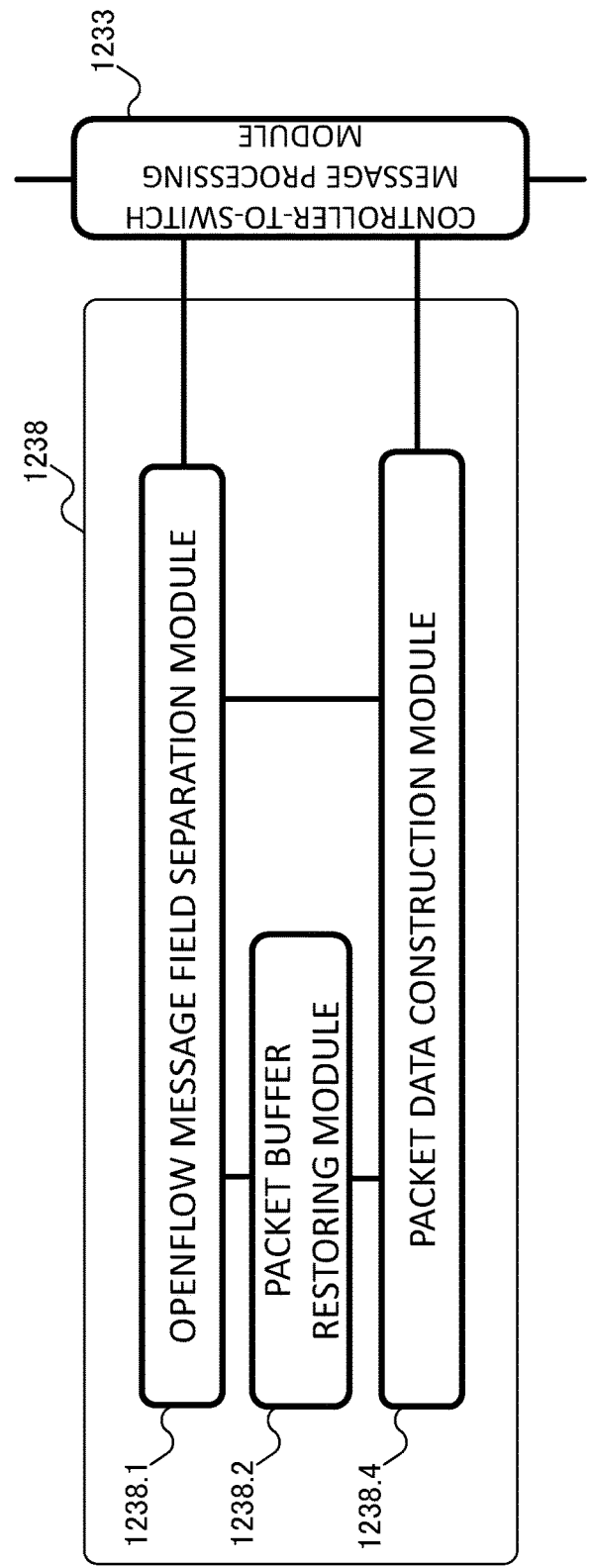
FIG. 7 is a drawing showing a configuration example of a packet_out message processing module inside the network switch of the first exemplary embodiment of the present invention.

FIG. 7 is a drawing showing a configuration of the packet_out message processing module 1238 in the OpenFlow message processing module. FIG. 7 shows a configuration comprising an OpenFlow message field separation module 1238.1, a packet buffer restoring module 1238.2, and a packet data construction module 1238.4.

Upon receiving controller message data and an asynchronous message processing request indicating packet_out message processing from the controller-to-switch message processing module 1233, the packet_out message processing module 1238 starts processing on the packet_out message 250. Further, the act of handing controller message data alone may serve as a controller message processing request without explicitly issuing a processing request.

In the packet_out message processing, the packet_out message 250 may be used as an example of the controller message data. The packet_out message 250 has ancillary data appended after the end of the Ethernet frame. In the present exemplary embodiment, it is assumed that the packet_out message 250 is handed over to the packet_out message processing module 1238 as the controller message data in the packet_out message processing.

Here, described is a process of restoring the packet_out message 250 to the same format as that of the packet configuration data given from the packet forwarding processing module when the packet_in message was sent. First, upon receiving the packet_out message 250 and the controller message processing request from the controller-to-switch message processing module 1233, the OpenFlow message field separation module 1238.1 divides the packet_out message 250 into the OpenFlow header 210, the packet_out message header 225, the packet data 230, and the ancillary data 240. The packet data 230 (the Ethernet frame) and the ancillary data 240 are given to the packet buffer restoring module 1238.2, and the packet_out message header 225 is given to the packet data construction module 1238.4.

When the OpenFlow message field separation module 1238.1 retrieves the ancillary data 240 from the packet_out message 250, for instance, the starting position of the ancillary data is calculated as follows.

> (The starting position of the ancillary data 240)=(the length of the OpenFlow header (fixed value))+ (the length of the packet_out message header 225 (variable length))+(the header length of the Ethernet frame (fixed value))+(the value of the packet length field included in the IP header).

The length of the packet_out message header 225 can be derived from the number of actions and the length of each action (fixed value) included in the packet_out message 250.

Further, since the header length of the Ethernet frame depends on the Ethernet format such as the DIX, IEEE 802.3, and IEEE 802.1Q formats, the Ethernet format needs to be identified from the value of the field following the source MAC address field in the Ethernet header.

Further, when the payload of the Ethernet frame is an ARP (Address Resolution Protocol) frame, the ARP frame is stored after the Ethernet header. In this case, when the type field value in the Ethernet header is 0x0806, the OpenFlow message field separation module 1238.1 determines that 28 bytes following the Ethernet header are the ARP frame and derives the starting position of the ancillary data 240.

The packet buffer restoring module 1238.2 performs a process of restoring the Ethernet frame and the ancillary data 240 handed by the OpenFlow message field separation module 1238.1 to the same format as that of the packet configuration data given from the packet forwarding processing module 1210 when the packet_in message was sent. For instance, the packet data information is set in each area of the socket buffer. Here, it is assumed that the packet data information has been set in the socket buffer.

The packet buffer restoring module 1238.2 hands the socket buffer to the packet data construction module 1238.4.

The packet data construction module 1238.4 forwards the packet_out message header 225 received from the OpenFlow message field separation module 1238.1 and the socket buffer received from the packet buffer restoring module 1238.2 to the controller-to-switch message processing module 1233. At this time, the action information included in the packet_out message header 225 may be verified or copied into another area, but this is omitted in the present exemplary embodiment.

Figure 8:
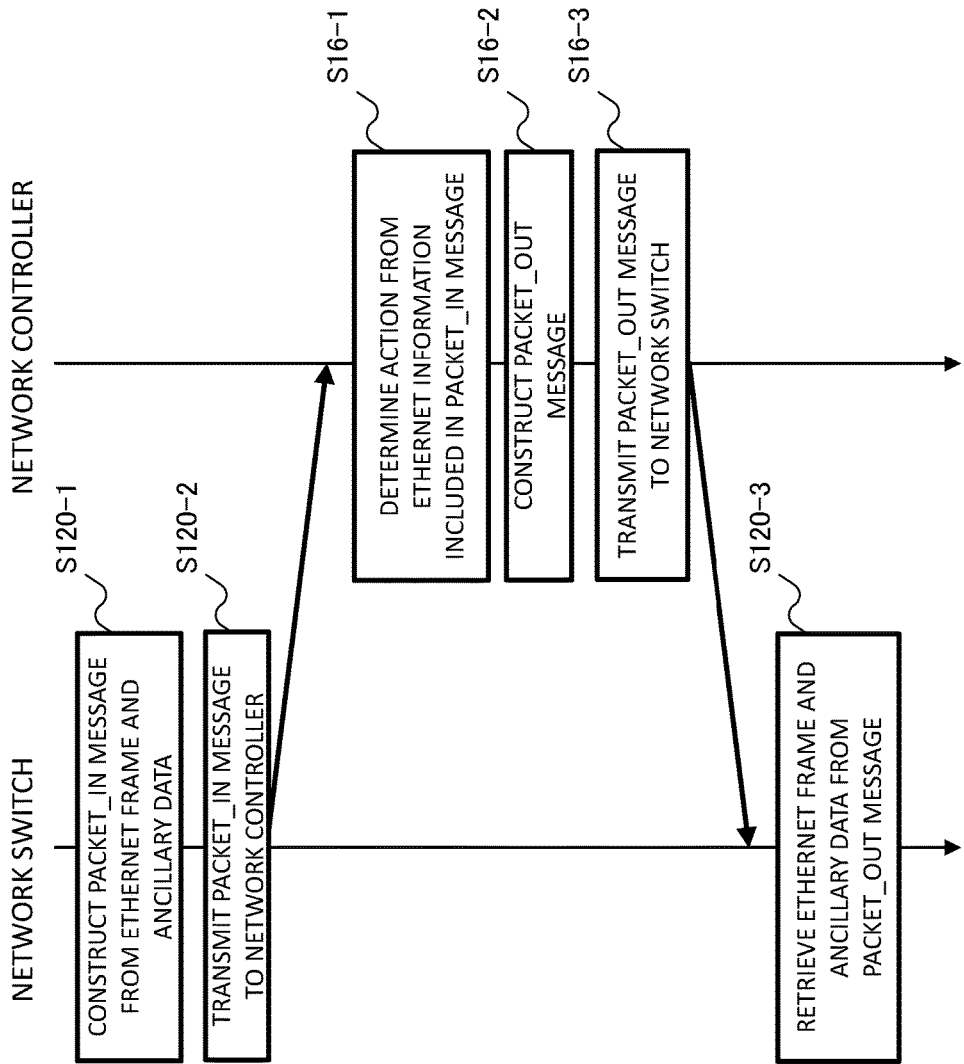
FIG. 8 is a sequence diagram showing an operation of the network switch and the network controller of the first exemplary embodiment of the present invention.

Next, the operation of the present exemplary embodiment will be described in detail with reference to the drawings. FIG. 8 is a sequence diagram showing an operation of the network switch and the network controller of the first exemplary embodiment of the present invention.

With reference to FIG. 8, first, the OpenFlow switch 12 constructs a packet_in message 200 from an Ethernet frame and ancillary data 240 (step S120-1).

Next, the OpenFlow switch 12 transmits the constructed packet_in message 200 to the OpenFlow controller 16 (step S120-2).

Next, from the Ethernet frame information included in the packet_in message 200, the OpenFlow controller 16 determines the action for the packet_in message 200 received from the OpenFlow switch 12 (step S16-1).

Next, the OpenFlow controller 16 constructs a packet_out message 250 from the OpenFlow header 210, the packet_in message header 220, the Ethernet frame information, and the ancillary data 240 included in the packet_in message 200, and the action determined in the step S16-1 (step S16-2).

Next, the OpenFlow controller 16 transmits the packet_out message 250 constructed in the step S16-2 to the OpenFlow switch 12 (step S16-3). At this time, the destination of the packet_out message 250 may be an OpenFlow switch 12 different from the OpenFlow switch 12 that sent the packet_in message.

Next, upon receiving the packet_out message 250, the OpenFlow switch 12 retrieves the Ethernet frame (the packet data 230 in FIG. 29) and the ancillary data 240 from the packet_out message 250 (step S120-3).

Figure 9:
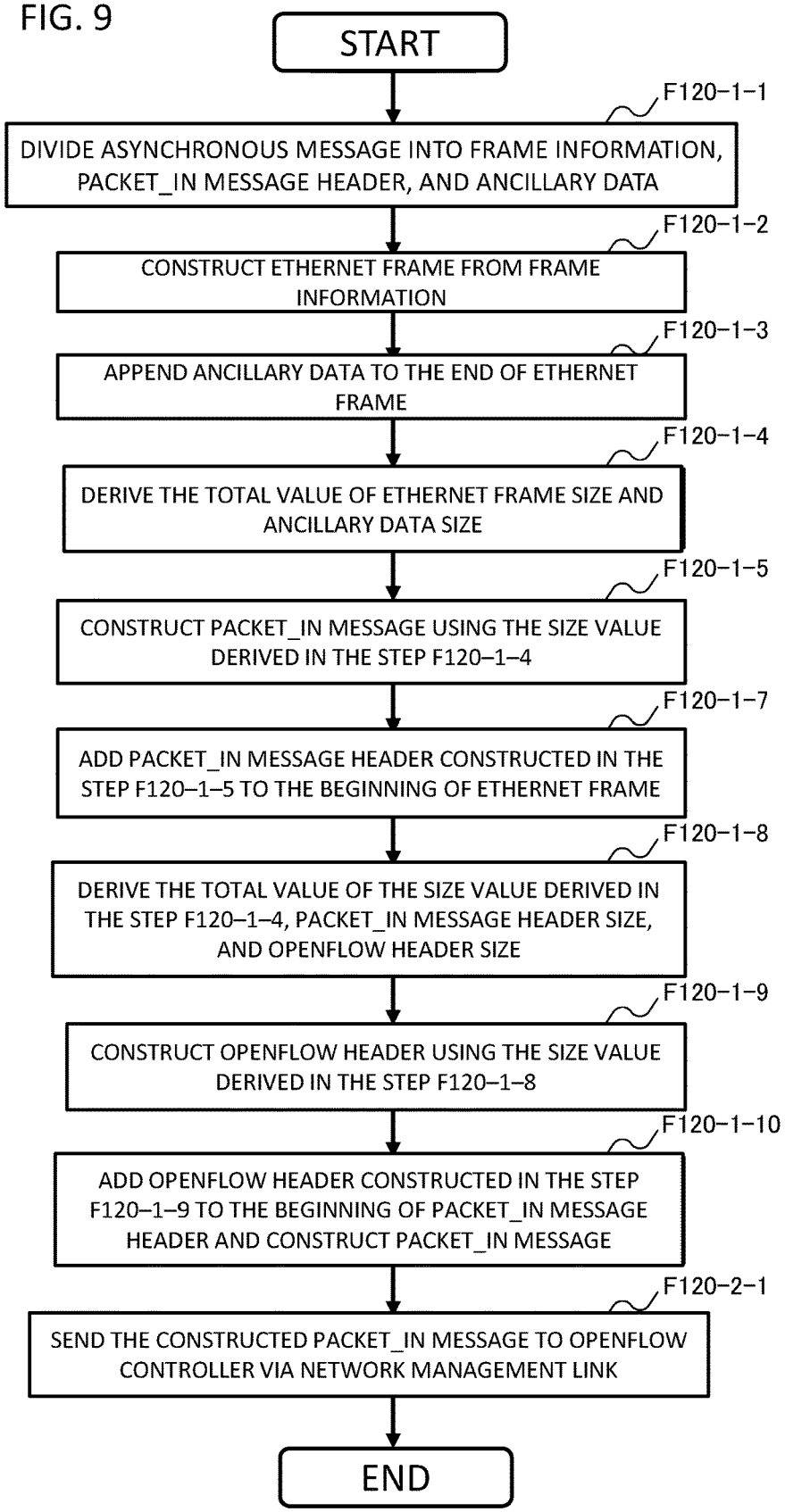
FIG. 9 is a flowchart showing in detail a process from step S120-1 to step S120-2 in FIG. 8.

Next, the process performed by the network switch from the step S120-1 to the step S120-2 in FIG. 8 will be described in detail. FIG. 9 is a flowchart showing in detail the process from the step S120-1 to the step S120-2 in FIG. 8. These steps are executed by the packet_in message processing module 1237 in the OpenFlow switch 12.

First, the packet_in message processing module 1237 divides a asynchronous message data into frame information, a packet message header, and the ancillary data 240 (step F120-1-1).

Next, the packet_in message processing module 1237 constructs an Ethernet frame from the frame information separated in the step F120-1-1 (step F120-1-2).

Next, the packet_in message processing module 1237 appends the ancillary data 240 separated in the step F120-1-1 to the end of the Ethernet frame constructed in the step F120-1-2 (step F120-1-3).

Next, the packet_in message processing module 1237 derives the total value of the size of the Ethernet frame constructed in the step F120-1-2 and the size of the ancillary data 240 (step F120-1-4).

Next, the packet_in message processing module 1237 constructs a packet_in message header 220 using the total size value derived in the step F120-1-4 (step F120-1-5).

Next, the packet_in message processing module 1237 adds the packet_in message header 220 constructed in the step F120-1-5 to the beginning of the Ethernet frame constructed in the step F120-1-2 (step F120-1-7). As a result, the packet_in message header 220 is added before the Ethernet frame, and the ancillary data 240 is appended after the Ethernet frame.

Next, the packet_in message processing module 1237 adds the size of the packet_in message header 220 and the size of the OpenFlow header 210 to the total size value derived in the step F120-1-4 (step F120-1-8).

Next, the packet_in message processing module 1237 constructs the OpenFlow header 210 using the size value derived in the step F120-1-8 (step F120-1-9).

Next, the packet_in message processing module 1237 construct a packet_in message 200 by adding the OpenFlow header 210 constructed in the step F120-1-9 to the beginning of the data constructed in the step F120-1-7 (step F120-1-10). As a result, the packet_in message 200 constituted by the OpenFlow header 210, the packet_in message header 220, the packet data 230 (the Ethernet frame), and the ancillary data 240 has been constructed (refer to FIG. 28).

Next, the packet_in message 200 constructed in the step F120-1-10 is transmitted to the OpenFlow controller 16 via the asynchronous message processing module 1232, the OpenFlow message input/output module 1236, the secure channel control module 1240, and the network management link 20 (step F120-2-1).

Figure 10:
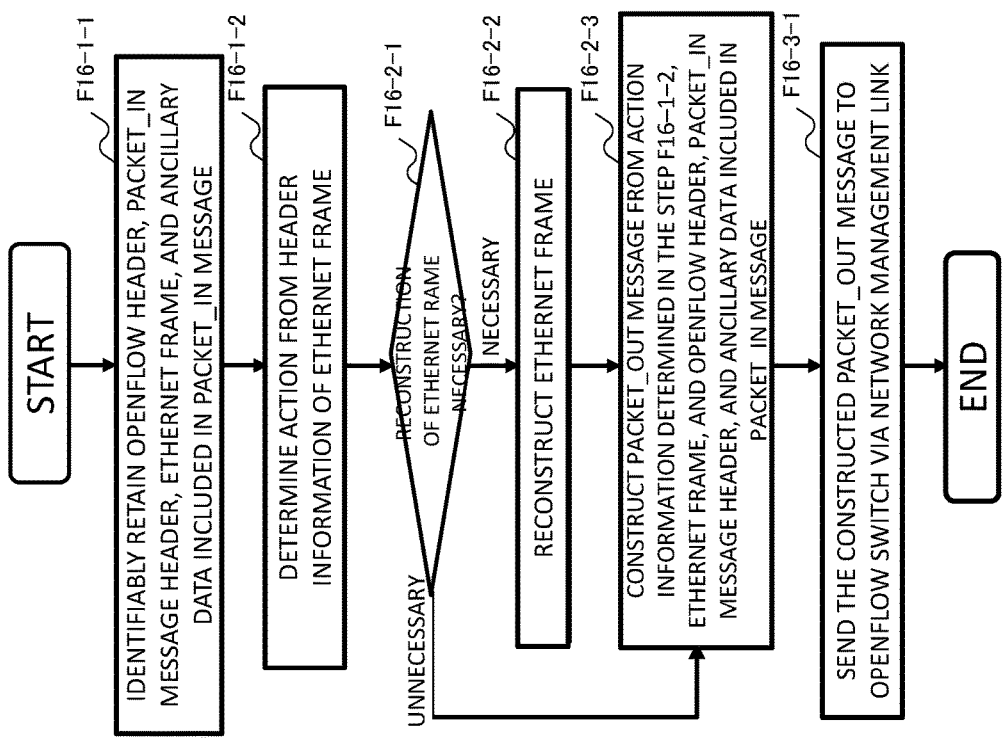
FIG. 10 is a flowchart showing in detail a process from step S16-1 to step S16-3 in FIG. 8.

Next, the process performed by the network controller from the step S16-1 to the step S16-3 in FIG. 8 will be described in detail. FIG. 10 is a flowchart showing in detail the process from the step S16-1 to the step S16-3 in FIG. 8. These steps are executed by the OpenFlow controller 16.

First, the OpenFlow controller 16 identifiably retains the OpenFlow header 210, the packet_in message header 220, the packet data 230 (the Ethernet frame), and the ancillary data 240 included in the packet_in message 200 (step F16-1-1). For instance, the OpenFlow message structure described in Non-Patent Literature 3 may be used. The position of the ancillary data 240 in the packet_in message 200 can be derived as described above.

Next, the OpenFlow controller 16 determines the action from the header information of the Ethernet frame (step F16-1-2).

Next, the OpenFlow controller 16 determines whether or not the Ethernet frame needs to be reconstructed (step F16-2-1). For instance, in a case of a system in which the OpenFlow controller 16 returns an ARP reply in response to an ARP request flowing through the system, the Ethernet frame of the ARP reply is reconstructed. Moreover, the OpenFlow controller 16 may execute an action that cannot be performed by the OpenFlow switch 12. These depend on the configuration of the system and the management policy.

Next, the OpenFlow controller 16 constructs the Ethernet frame (step F16-2-2) when the reconstruction of the Ethernet frame is necessary ("Necessary" in the step F16-2-1).

When the reconstruction of the Ethernet frame is unnecessary ("Unnecessary" in the step F16-2-1) or after the Ethernet frame has been reconstructed (the step F16-2-2), the OpenFlow controller 16 constructs a packet_out message 250 (step F16-2-3). The packet_out message 250 is created using the action information determined in the step F16-1-2, the Ethernet frame, and the OpenFlow header 210, the packet_in message header 220, and the ancillary data 240 included in the packet_in message 200. The Ethernet frame used here is the one reconstructed in the step F16-2-2 or the one included in the packet_in message 220.

Next, the OpenFlow controller 16 sends the packet_out message 250 constructed in the step F16-2-3 to the OpenFlow switch 12 via the network management link 20 (step F16-3-1).

Further, in a system in which the OpenFlow controller 16 does not need to reconstruct the Ethernet frame and refers only to the header of the Ethernet frame, it is not necessary to retain the ancillary data 240 in an identifiable manner in the step F16-1-1.

Figure 11:
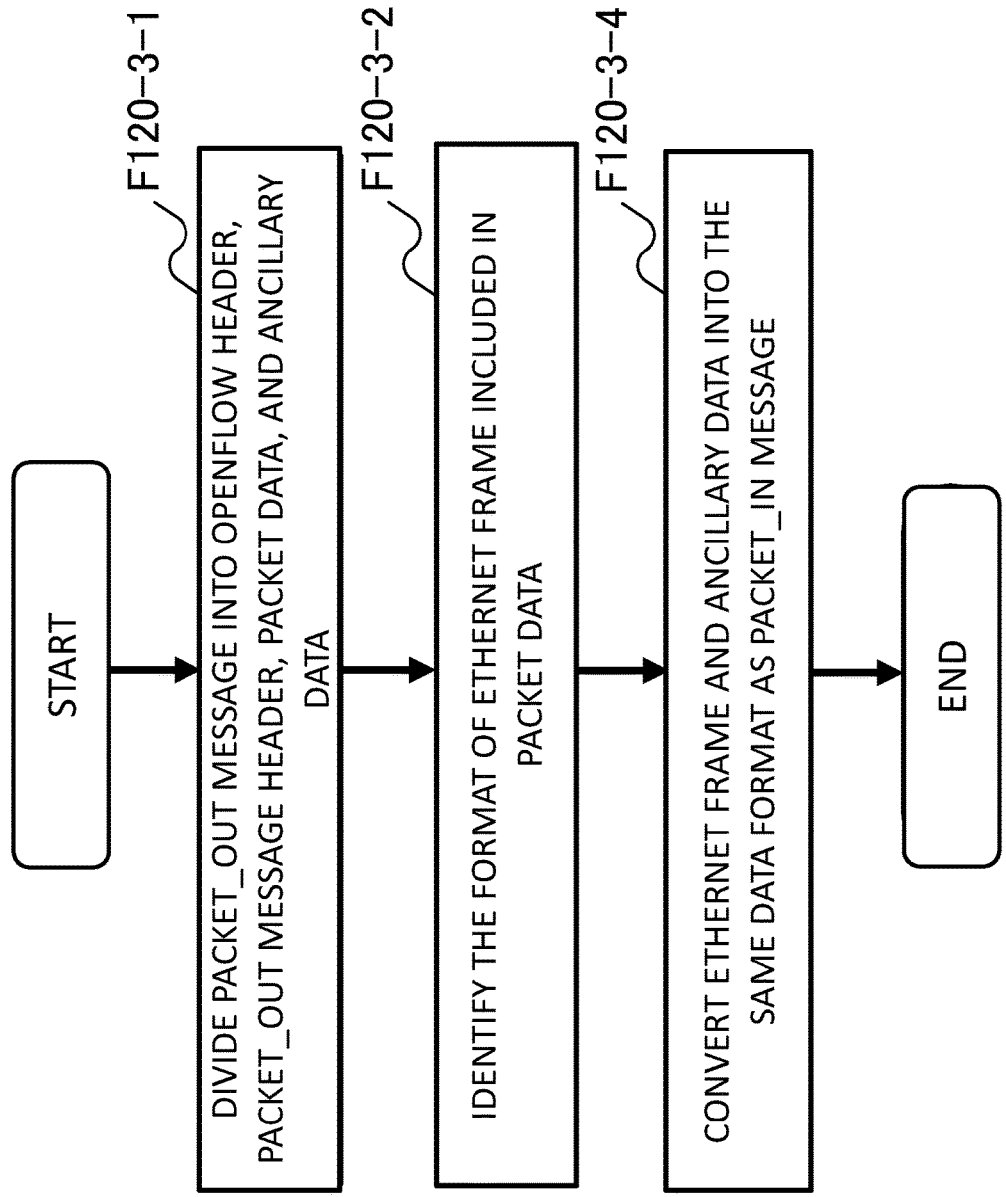
FIG. 11 is a flowchart showing in detail a process of step S120-3 in FIG. 8.

Next, the process performed by the network switch in the step S120-3 in FIG. 8 will be described in detail. FIG. 11 is a flowchart showing in detail the process of the step S120-3 in FIG. 8. These steps are executed by the packet_out message processing module 1238 in the OpenFlow switch 12.

With reference to FIG. 11, the packet_out message processing module 1238 first divides the packet_out message 250 into the OpenFlow header 210, the packet_out message header 225, the packet data 230, and the ancillary data 240 (step F120-3-1). The ancillary data 240 can be identified by deriving the starting position of the ancillary data 240 from information such as the length of the OpenFlow header 210, the length of the packet_out message header 225, and the length of the frame included in the packet header of the Ethernet frame.

Next, the packet_out message processing module 1238 identifies the formats of the Ethernet frame included in the packet data 230 (step F120-3-2). The formats of the Ethernet frame include, for instance, the DIX, IEEE 802.3, and IEEE 802.1Q formats related to the Ethernet header, and formats related to the payload of the Ethernet frame such as whether it is an ARP packet or not.

Next, the packet_out message processing module 1238 converts the data formats of the Ethernet frame and the ancillary data 240 separated in the step F120-3-1 into that of the packet_out message 250 used in the OpenFlow switch 12 (step F120-3-4). As this data format, for instance a structure having information included the socket buffer and the packet_out message header as a member may be used.

As described above, according to the present exemplary embodiment, the packet_in message 200 and the packet_out message 250 can contain the ancillary data 240. The ancillary data 240 can be properly retrieved by using information such as the length of the OpenFlow header 210, the length of the packet_in message header 220, the length of the packet_out message header 225, and the length of the frame included in the Ethernet frame.

Further, according to the present exemplary embodiment, the OpenFlow controller 16 is able to control the network using the ancillary data 240 since the packet_in message 200 contains the ancillary data 240. For instance, the information of the application that has sent a packet and user information can be sent to the controller as the ancillary data 240, and this can be applied to QoS control.

Second Exemplary Embodiment

Next, a second exemplary embodiment of the present invention in which the configuration of the ancillary data management module 180 in the OpenFlow controller 16 is changed will be described in detail with reference to the drawings. Since the basic configuration otherwise is the same as that of the first exemplary embodiment, the differences from the first exemplary embodiment will be mainly described below.

Figure 12:
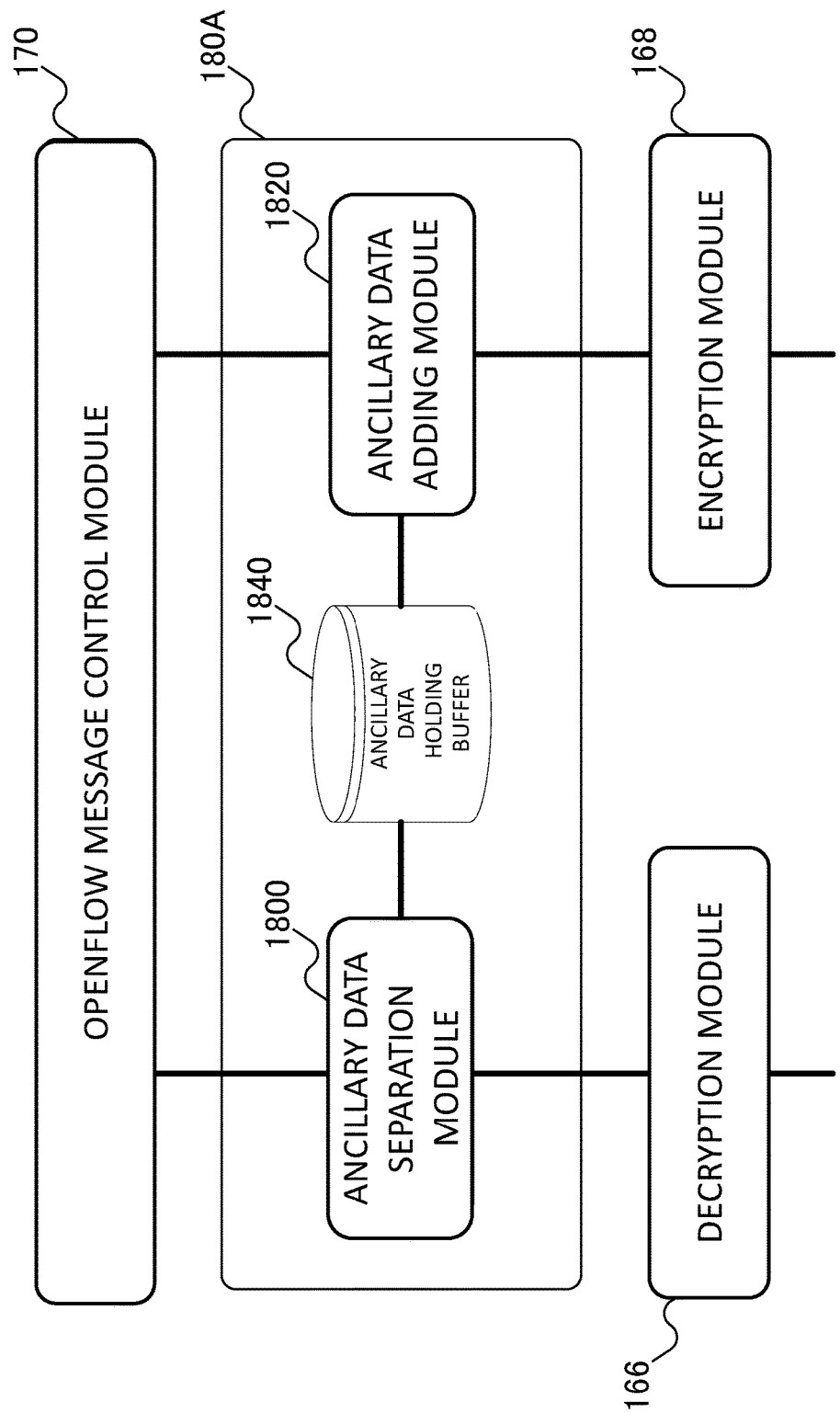
FIG. 12 is a drawing showing a detailed configuration of an ancillary data management module in a network controller of a second exemplary embodiment of the present invention.

FIG. 12 is a drawing showing a detailed configuration of an ancillary data management module 180A in the Open-Flow controller 16 of the present exemplary embodiment. FIG. 12 shows a configuration comprising an ancillary data separation module 1800, an ancillary data adding module 1820, and an ancillary data holding buffer 1840.

The ancillary data separation module 1800 separates the ancillary data 240 from the packet_in message 200 received from the decryption module 166.

The ancillary data adding module 1820 adds the ancillary data 240 held by the ancillary data holding buffer 1840 to the packet_out message 250 received from the OpenFlow message control module 170.

For instance, the ancillary data holding buffer 1840 can be realized as a table having an entry ID as a key and the ancillary data 240 as a value. The description of the present exemplary embodiment assumes that the ancillary data holding buffer 1840 is realized as such a table, but the configuration of the present exemplary embodiment is not limited thereto.

Figure 13:
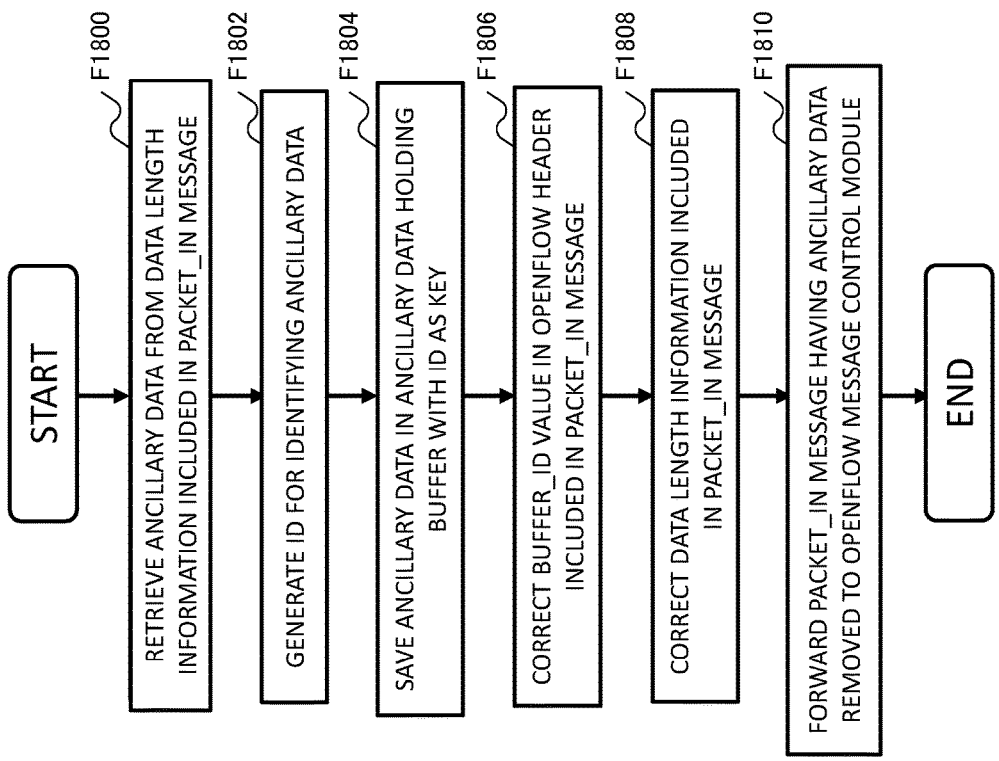
FIG. 13 is a flowchart showing how the ancillary data management module of the second exemplary embodiment of the present invention retrieves ancillary data from a packet_in message and stores the data.

Next, the operation of the present exemplary embodiment will be described with reference to the drawings. FIG. 13 is a flowchart showing how the ancillary data management module 180A retrieves the ancillary data 240 from the packet_in message 200 and stores the data.

The ancillary data separation module 1800 separates the ancillary data 240 from the packet_in message 200 received from the decryption module 166 (step F1800). The storing location of the ancillary data 240 in the packet_in message 200 can be derived using the method described in the first exemplary embodiment.

Next, the ancillary data separation module 1800 generates an entry ID for uniquely identifying the ancillary data 240 in the ancillary data holding buffer 1840 (step F1802). As an example of a unique entry ID, a hash value based on the session ID of the secure channel to the OpenFlow switch that has transmitted the packet_in message 200 and the Ethernet header included in the packet_in message 200 may be used. Here, the description continues assuming that a 32-bit hash value is generated as an entry ID from these pieces of information, however, the configuration of the present exemplary embodiment is not limited thereto.

Next, the ancillary data separation module 1800 stores the separated ancillary data 240 in the ancillary data holding buffer 1840 (step F1804).

Next, the ancillary data separation module 1800 sets this entry ID in a buffer ID field (32-bit wide) included in the packet_in message header 220 of the packet_in message 200 (step F1806). In OpenFlow, in a case where the OpenFlow switch 12 does not buffer the Ethernet frame when sending a packet_in message, "−1" (fixed value) is set in this buffer ID field. If the OpenFlow switch 12 does buffer the Ethernet frame, since a value indicating a buffer ID is set, one can avoid losing the buffer ID by storing the buffer ID, the OpenFlow header 210, which is the header information of the OpenFlow message 200, or the packet_in message header 220 in the ancillary data holding buffer 1840. Further, this buffer ID may be used when the aforementioned hash value is derived. When the size of the entry ID is not less than 32 bits, it is desirable that the packet_in message be extended so as to be able to hold the entry ID.

Next, the ancillary data separation module 1800 reduces the value in the field indicating the length of the OpenFlow message 200 in the OpenFlow header 210 of the packet_in message 200 and the value in the field indicating the length of the Ethernet frame in the packet_in message header 220 by the size value of the ancillary data 240 (step F1808). As described in the first exemplary embodiment, the total value of the length of the Ethernet frame and the length of the ancillary data is stored in the field of the Ethernet frame length included in the packet_in message header 220.

Next, the ancillary data separation module 1800 forwards the packet_in message 200 without the ancillary data to the OpenFlow message control module 170 (step F1810).

Upon receiving the packet_in message 200 from the ancillary data management module 180A, the OpenFlow message control module 170 determines the action from the header information of the Ethernet frame included in the OpenFlow message 200 and generates a packet_out message 250 as described in the first exemplary embodiment of the present invention. The entry ID of the ancillary data holding buffer 1840 is stored as the value indicating the buffer ID of this packet_out message 250.

Next, the OpenFlow message control module 170 forwards the generated packet_out message 250 to the ancillary data management module 180A.

The packet_out message 250 forwarded by the OpenFlow message control module 170 is given to the ancillary data adding module 1820 of the ancillary data management module 180A.

Figure 14:
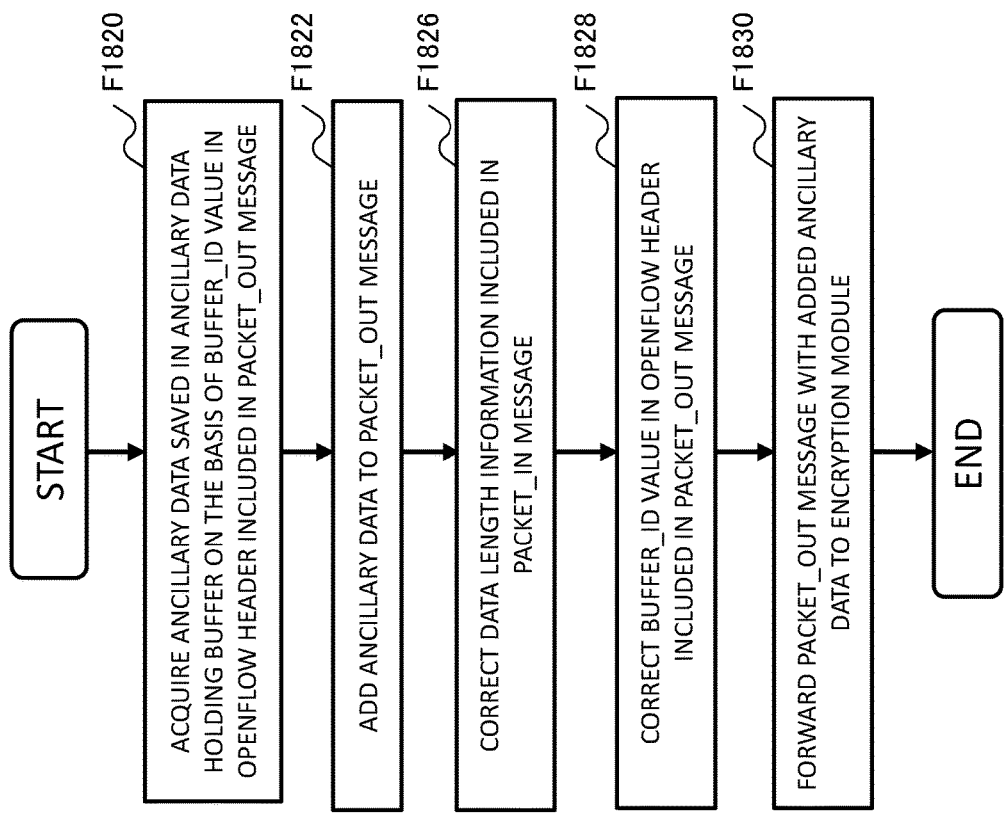
FIG. 14 is a flowchart showing how the ancillary data management module of the second exemplary embodiment of the present invention adds ancillary data to a packet_out message.

FIG. 14 is a flowchart showing how the ancillary data adding module 1820 adds the ancillary data 240 to the packet_out message 250.

With reference to FIG. 14, the ancillary data adding module 1820 acquires the ancillary data 240 by referring to the ancillary data holding buffer 1840 using the buffer ID included in the packet_out message header 225 of the packet_out message 250 as the entry ID (step F1820). The entry ID is retrieved from a different area when it is held in an area other than the buffer ID field.

Next, the ancillary data adding module 1820 adds the acquired ancillary data 240 to the packet_out message 250 (step F1822). Further, the ancillary data adding module 1820 adds the size of the ancillary data 240 to the value in the OpenFlow header 210 included in the packet_out message 250 indicating the size of the packet_out message 250 (step F1826).

Next, the ancillary data adding module 1820 rewrites the buffer ID field of the packet_out message header 225 included in the packet_out message 250 to "−1" when the OpenFlow switch 12 does not buffer the Ethernet frame (step F1828). Here, when the OpenFlow switch 12 buffers the Ethernet frame, the buffer ID must be held, for instance, by holding the buffer ID in the ancillary data holding buffer 1840, as described above. In this case, the ancillary data adding module 1820 writes the value of the buffer ID held back into the packet_out message header 225.

Next, the ancillary data adding module 1820 forwards the packet_out message 250 having the ancillary data added thereto to the encryption module 168 (step F1830).

As described, according to the second exemplary embodiment in which the ancillary data holding buffer 1840 is provided, the OpenFlow message control module 170 is able to process an OpenFlow message without being aware of the presence of the ancillary data 240. In other words, there is an advantageous effect that the existing OpenFlow message control module 170 can be utilized without any modification. This is due to the configuration in which the ancillary data management module 180A removes the ancillary data 240 from the packet_in message 200 having the ancillary data 240 added thereto, holds the ancillary data, and changes the length information included in the OpenFlow header 210 and the packet_in message header 220.

Third Exemplary Embodiment

Next, a third exemplary embodiment of the present invention in which an ancillary data manager 18 is provided between the OpenFlow controller and the OpenFlow switch (vSwitch supporting OpenFlow) will be described in detail with reference to the drawings.

Figure 15:
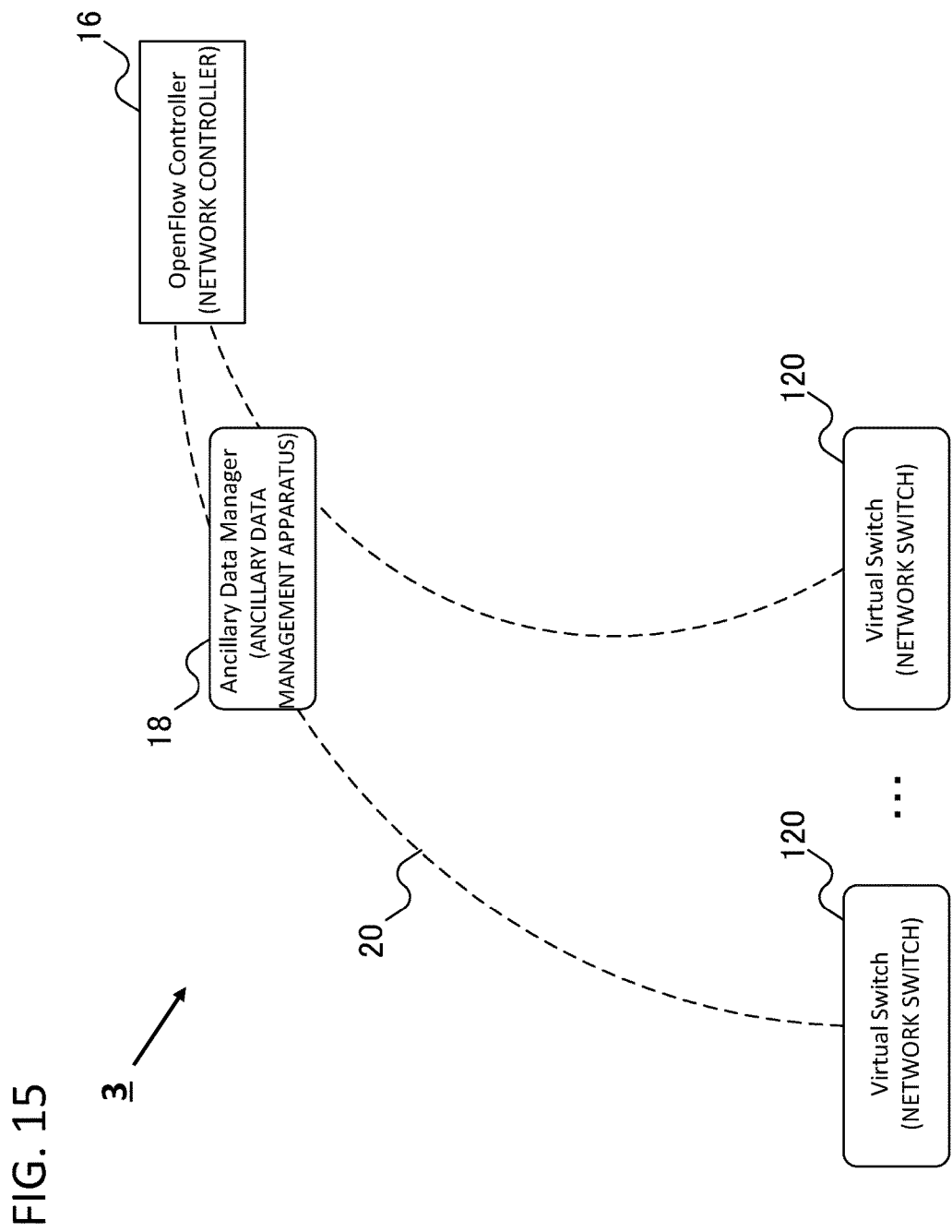
FIG. 15 is a drawing showing a configuration of an ancillary data retention system of a third exemplary embodiment of the present invention.

FIG. 15 is a drawing showing a configuration of an ancillary data retention system 3 of the third exemplary embodiment of the present invention. With reference to FIG. 15, in the ancillary data retention system 3, the ancillary data manager 18 is provided on the network management link 20 between at least one network switch (Virtual Switch) 120 and the network controller (OpenFlow controller) 16.

Each virtual switch 120 establishes a secure channel connection with the ancillary data manager 18, which establishes a secure channel connection that corresponds to each of these connections with the OpenFlow controller 16.

The ancillary data manager 18 removes the ancillary data 240 from the packet_in message 200 sent by the virtual switch 120 and holds the ancillary data 240 removed. Then the ancillary data manager 18 transmits the packet_in message 200 without the ancillary data 240 to the OpenFlow controller 16.

Further, the ancillary data manager 18 adds the ancillary data 24 to the packet_out message 250 sent by the OpenFlow controller 16. Then the ancillary data manager 18 transmits the packet_out message 250 having the ancillary data 240 added thereto to the virtual switch 120.

Figure 16:
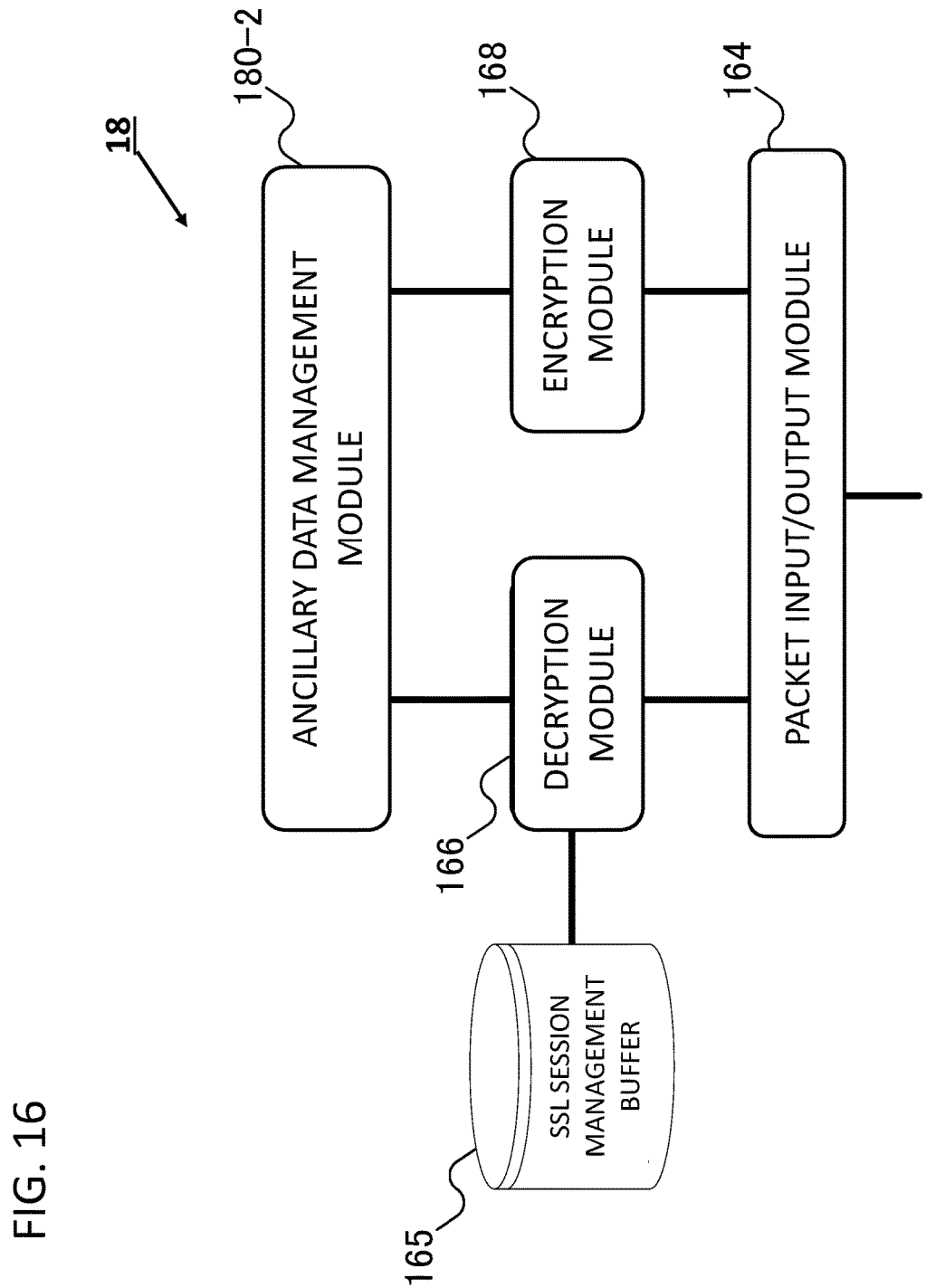
FIG. 16 is a drawing showing a configuration of an ancillary data manager of the third exemplary embodiment of the present invention.

FIG. 16 is a drawing showing a detailed configuration of the ancillary data manager 18. The ancillary data manager 18 in FIG. 16 configurationally differs from the OpenFlow controller 16 of the second exemplary embodiment shown in FIG. 2 in that the ancillary data manager 18 comprises an SSL session management buffer 165 and in the details of an ancillary data management module 180-2. Otherwise, the same signs are given to the elements common to FIGS. 2 and 16 and a detailed explanation will be omitted.

Figure 17:
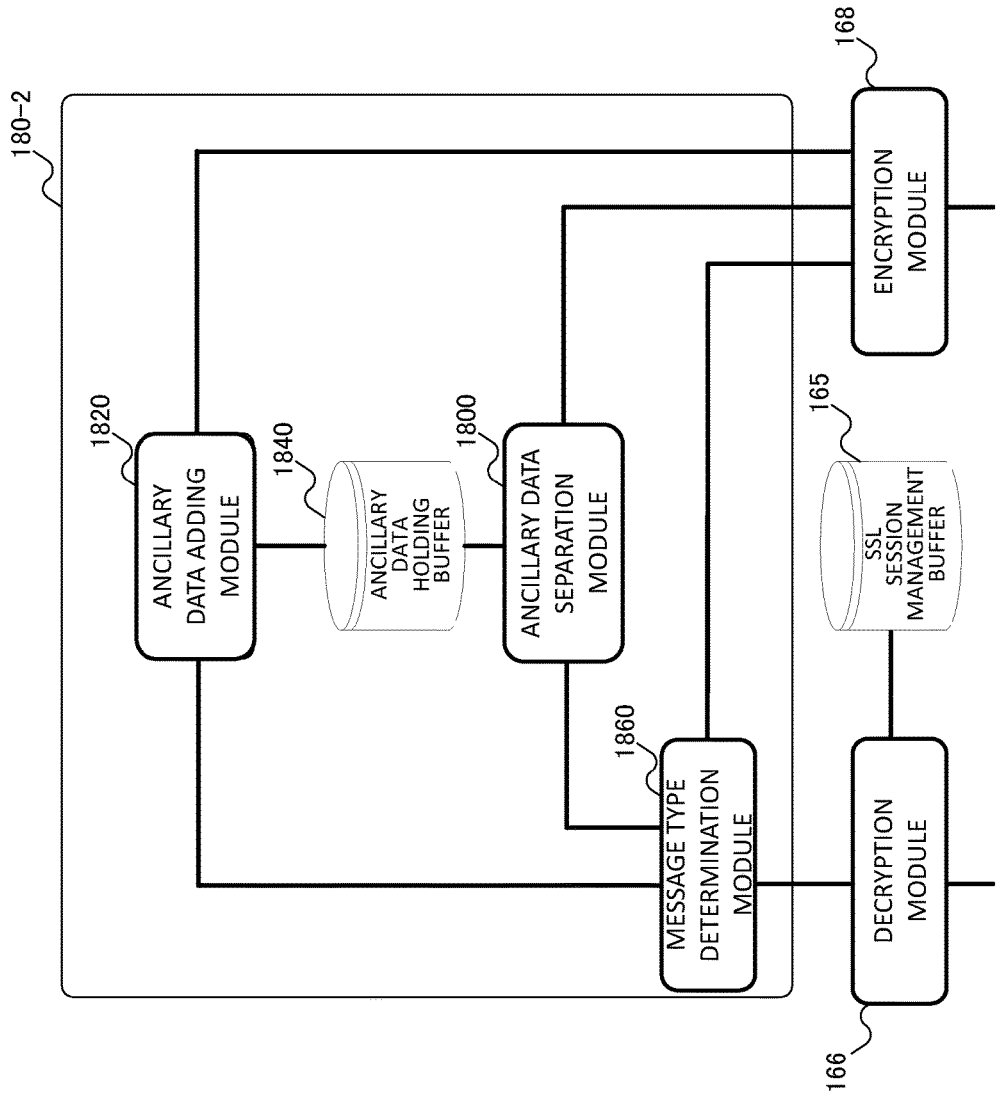
FIG. 17 is a drawing showing a configuration of an ancillary data management module in the ancillary data manager of the third exemplary embodiment of the present invention.

FIG. 17 is a drawing showing a configuration of the ancillary data management module 180-2. The ancillary data management module 180-2 differs from the ancillary data management module 180 shown in FIG. 12 in that each of the ancillary data adding module 1820 and the ancillary data separation module 1800 is connected to both the decryption module 166 and the encryption module 168. Further, the ancillary data management module 180-2 differs from the ancillary data management module 180 in FIG. 12 in that the ancillary data management module 180-2 comprises a message type determination module 1860. Otherwise, the same signs are given to the elements common to FIGS. 12 and 17 and a detailed explanation will be omitted.

The SSL session management buffer 165 is a buffer that manages the correspondence between the secure channel (SSL) connection between the virtual switch 120 and the ancillary data manager 18 and the corresponding secure channel (SSL) connection between the ancillary data manager 18 and the OpenFlow controller 16.

Figure 18:
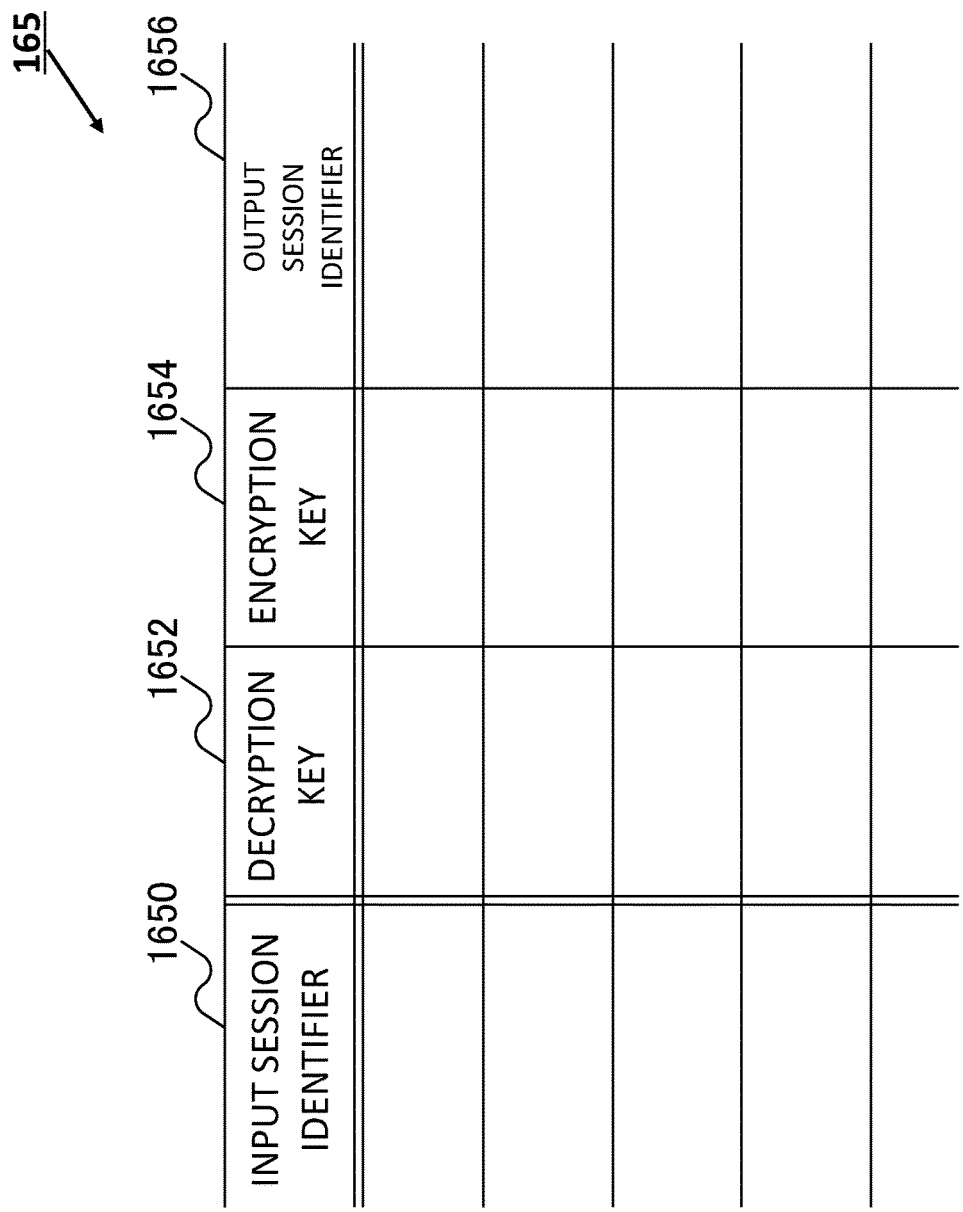
FIG. 18 is a drawing showing a configuration example of an SSL session management buffer in the ancillary data manager of the third exemplary embodiment of the present invention.

FIG. 18 shows a configuration example of the SSL session management buffer 165. FIG. 18 shows the SSL session management buffer 165 as a table capable of storing entries that associate an SSL key (a decryption key 1652) for decrypting a packet received by the decryption module 166, an SSL key (an encryption key 1654) that encrypts a packet transmitted by the encryption module 168, and a TCP session identifier (an output session identifier 1656) for a packet transmitted by the encryption module 168 as values with an input session identifier as a key. Here, the input session identifier 1650 is an identifier for a TCP session in which the decryption module 166 has received a packet. Examples of TCP session identifiers include source IP address, destination IP address, and a set of a source TCP port number and a destination TCP port number.

The ancillary data manager 18 refers to the SSL session management buffer 165 described above when the ancillary data manager 18 decrypts the packet_in message 200 received from the virtual switch 120, removes the ancillary data 240, encrypts the packet, and transmits the packet to the OpenFlow controller 16. Further, the SSL session management buffer 165 is referred to when the packet_out message 250 received from the OpenFlow controller 16 is decrypted, the ancillary data 240 is added, and the message is encrypted and transmitted to the virtual switch 120. As a result, transfer of the TCP session is achieved.

There are two directions of communication relayed by the ancillary data manager 18 for a single virtual switch 120: from the virtual switch 120 to the OpenFlow controller 16, and from the OpenFlow controller 16 to the virtual switch 120. Therefore, the following two entries are registered in the SSL session management buffer 165.

(1) Entry 1
The input session identifier 1650: the information of a session with the virtual switch 120
The decryption key 1652: the decryption key used for SSL communication with the virtual switch 120
The encryption key 1654: the encryption key used for SSL communication with the OpenFlow controller 16
The output session identifier 1656: the information of a session with the OpenFlow controller 16
(2) Entry 2
The input session identifier 1650: the information of a session with the OpenFlow controller 16
The decryption key 1652: the decryption key used for SSL communication with the OpenFlow controller 16
The encryption key 1654: the encryption key used for SSL communication with the virtual switch 120
The output session identifier 1656: the information of a session with the virtual switch 120

Here, the ancillary data manager 18 and the OpenFlow controller 16 may be connected by only a single secure channel. On the other hand, a plurality of secure channels may be established between the ancillary data manager 18 and the OpenFlow controller 16, having at least two secure channels for the virtual switches 120 share one secure channel for the OpenFlow controller 16.

In these cases, an ID of the virtual switch 120 needs to be attached to the packet_in message 200 so that the OpenFlow controller 16 is able to identify which virtual switch 120 has sent the message. Further, the packet_out message 250 from the OpenFlow controller 16 needs to have an ID of the virtual switch 120 attached thereto so as to identify to which virtual switch 120 the packet_out message 250 is sent. This is because neither the packet_in message 200 nor the packet_out message 250 has any field in which an ID for identifying the virtual switch 120 is set.

When an OpenFlow message such as the packet_in message 200 is supplied, the decryption module 166 refers to the SSL session management buffer 165 using the information of the session in which the OpenFlow message is transmitted, and acquires the decryption key 1652, the encryption key 1654, and the output session identifier 1656.

Next, the decryption module 166 decrypts the OpenFlow message using the acquired decryption key 1652, and forwards the decrypted OpenFlow message to the ancillary data management module 180-2 along with the information of the encryption key 1654 and the output session identifier 1656.

The message type determination module 1860 receives the OpenFlow message, the encryption key 1654, and the output session identifier 1656 sent to the ancillary data management module 180-2.

The message type determination module 1860 determines the message type by referring to the OpenFlow header 210 of the OpenFlow message.

When the OpenFlow message is a packet_in message 200, the message type determination module 1860 forwards the OpenFlow message, the encryption key 1654, and the output session identifier 1656 to the ancillary data separation module 1800.

When the OpenFlow message is a packet_out message 250, the message type determination module 1860 forwards the OpenFlow message, the encryption key 1654, and the output session identifier 1656 to the ancillary data adding module 1820.

When the OpenFlow message is neither a packet_in message 200 nor a packet_out message 250, the message type determination module 1860 forwards the OpenFlow message, the encryption key 1654, and the output session identifier 1656 to the encryption module 168.

Note that, in the present exemplary embodiment, it is assumed that an OpenFlow message having ancillary data 240 is a packet_in message 200, and an OpenFlow message that needs to have ancillary data 240 added thereto is a packet_out message 250, however, ancillary data 240 can be retained in the same manner even in cases where other types of OpenFlow messages deal with ancillary data 240.

For instance, the ancillary data separation module 1800 may forward any OpenFlow message from the virtual switch 120 regardless of the presence of ancillary data 240. In this case, the ancillary data separation module 1800 determines the presence of ancillary data from the value indicating the data length included in the OpenFlow message, and when this value is zero or not greater than a predetermined value, the ancillary data separation module 1800 does not perform the ancillary data separation processing and forwards the OpenFlow message to the OpenFlow controller 16, determining that the OpenFlow message does not include any ancillary data.

Ancillary data 240 can be added to a message from the OpenFlow controller 16. For instance, ancillary data 240 can be added to an OpenFlow message other than the packet_out message 250 by specifying an entry ID value in the ancillary data holding buffer 1840 as an identifier of the ancillary data to be added to the OpenFlow message. In this case, since some OpenFlow messages cannot have a buffer ID specified in its message header, this may be implemented as an OpenFlow vendor proprietary extension.

The OpenFlow message forwarded to the ancillary data separation module 1800 has the ancillary data 240 removed. The OpenFlow message without the ancillary data 240 is forwarded to the encryption module 168 along with the encryption key 1654 and the output session identifier 1656.

The ancillary data 240 is added to the OpenFlow message forwarded to the ancillary data adding module 1820. The OpenFlow message having the ancillary data 240 added thereto is forwarded to the encryption module 168 along with the encryption key 1654 and the output session identifier 1656.

The OpenFlow message forwarded to the encryption module 168 is encrypted using the encryption key 1654 forwarded at the same time, and is transmitted to an appropriate destination according to the information in the output session identifier 1656.

Figure 19:
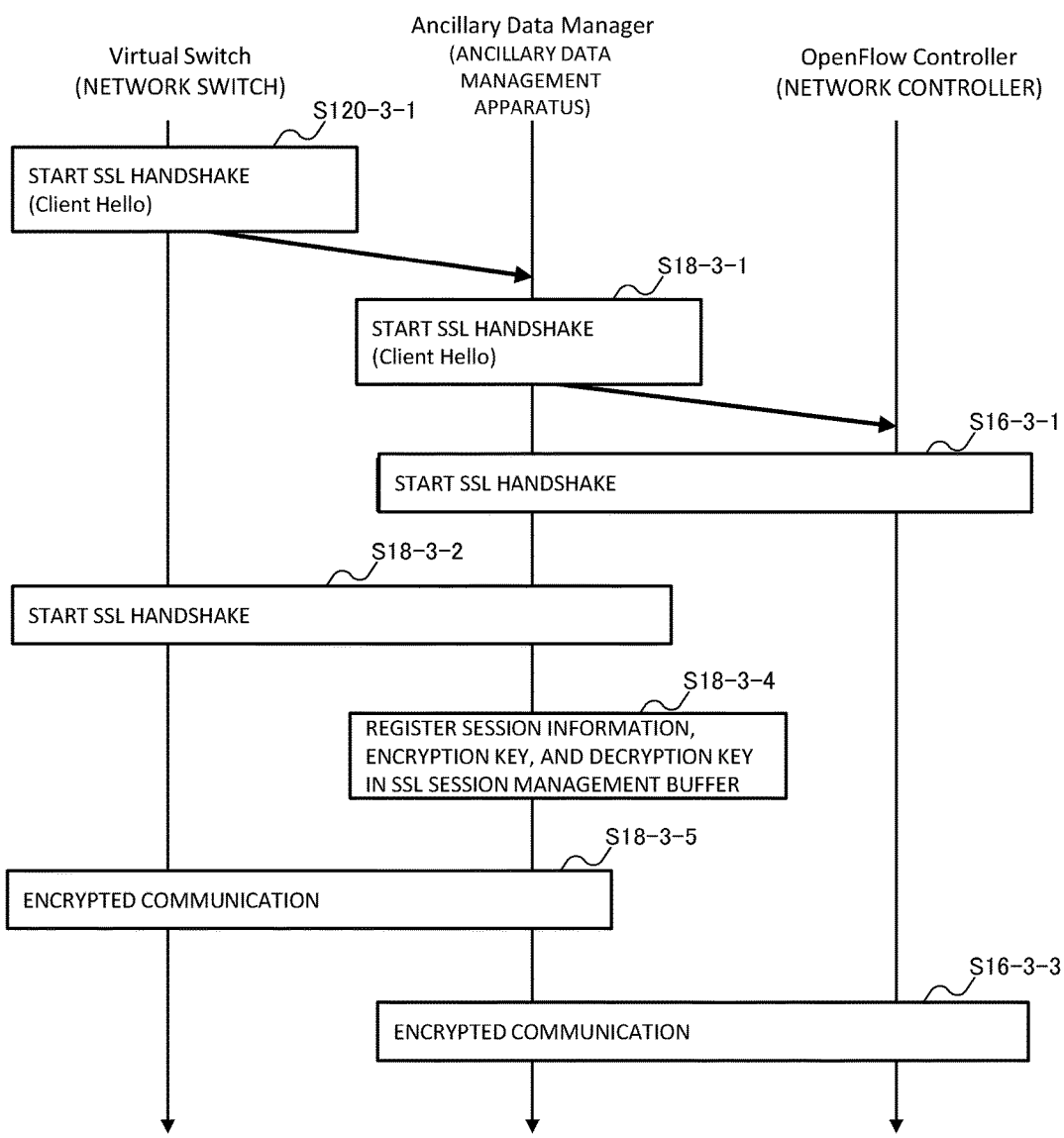
FIG. 19 is a sequence diagram showing a flow of configuring secure channel connections between a network switch and the ancillary data manager and between the ancillary data manager and a network controller of the third exemplary embodiment of the present invention.

FIG. 19 is a sequence diagram showing an operation of the virtual switch 120, the ancillary data manager 18, and the OpenFlow controller 16 of the third exemplary embodiment of the present invention.

With reference to FIG. 19, the virtual switch 120 first starts a handshake with the ancillary data manager 18 to establish an SSL connection (step S120-3-1). At this time, the virtual switch 120 does not need to know that it is making an SSL connection with the ancillary data manager 18 and the process is the same as when a secure channel is established with the OpenFlow controller 16.

Next, upon receiving an SSL connection request from the virtual switch 120, the ancillary data manager 18 starts a handshake with the OpenFlow controller 16 to establish an SSL connection (step S18-3-1).

Next, the ancillary data manager 18 and the OpenFlow controller 16 execute handshake processing to establish an SSL connection (step S16-3-1). Refer to Non-Patent Literature 4 for the details of this processing. During this handshake processing, an encryption key and decryption key required for SSL communication are generated between the ancillary data manager 18 and the OpenFlow controller 16.

Next, the virtual switch 120 and the ancillary data manager 18 execute handshake processing to establish an SSL connection (step S18-3-2). During this handshake processing, an encryption key and decryption key required for SSL communication are generated between the virtual switch 120 and the ancillary data manager 18.

Next, the ancillary data manager 18 registers the encryption keys and the decryption keys generated in the steps S16-3-1 and S18-3-2 in the SSL session management buffer 165 along with the information of the session with the virtual switch 120 and the information of the session with the OpenFlow controller 16 (step S18-3-4).

SSL-encrypted communication is performed between the virtual switch 120 and the ancillary data manager 18 and between the ancillary data manager 18 and the OpenFlow controller 16 thereafter (steps S18-3-5 and S16-3-3).

Note that, in OpenFlow, the OpenFlow switch 12 and the OpenFlow controller 16 can exchange messages without encrypting the traffic flowing through the secure channel. In this case, the use of and the processing by the SSL-related module described in the present exemplary embodiment are not necessary.

Figure 20:
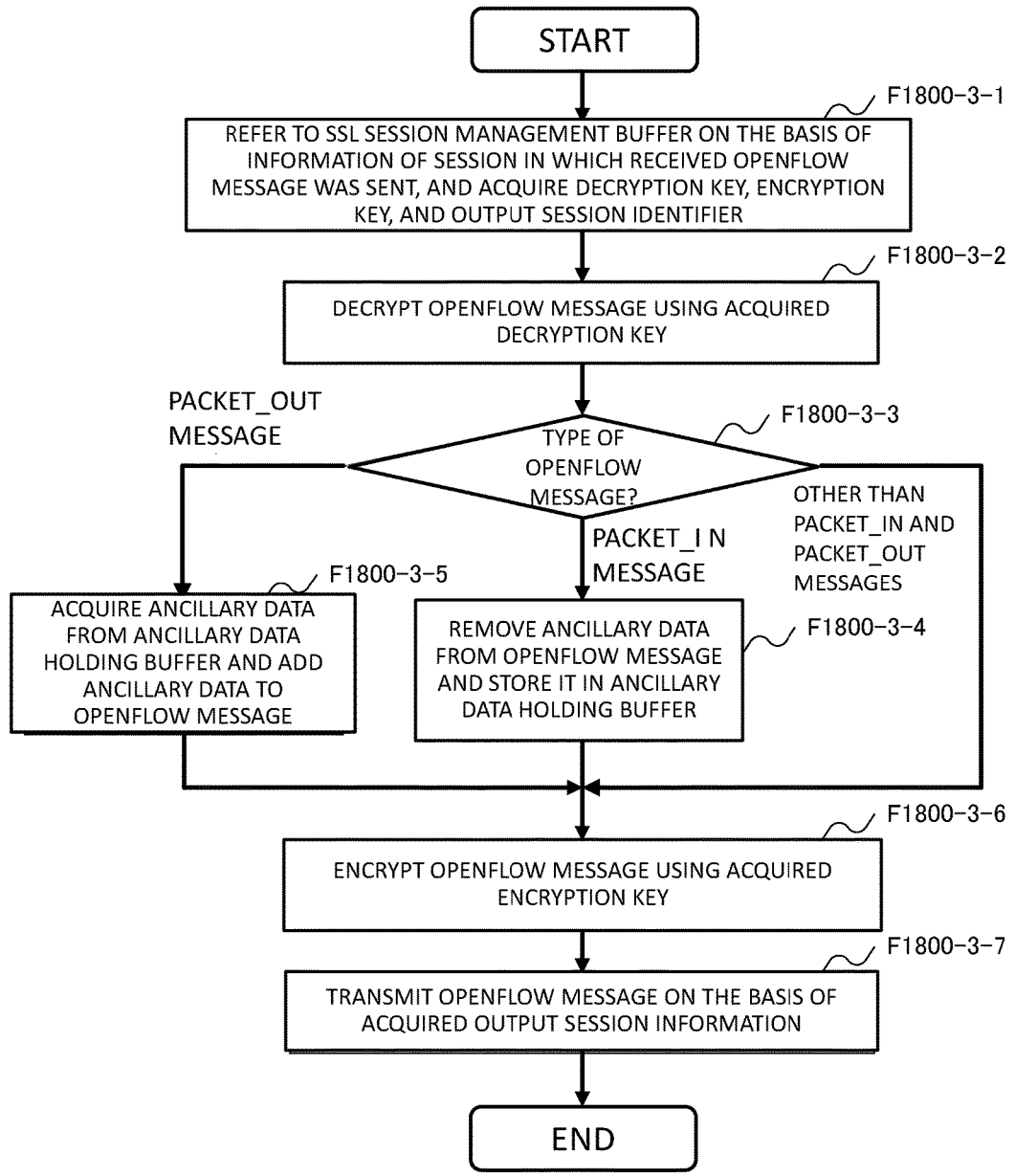
FIG. 20 is a flowchart showing how an OpenFlow message is processed after an SSL session has been established in the third exemplary embodiment of the present invention.
Figure 21:
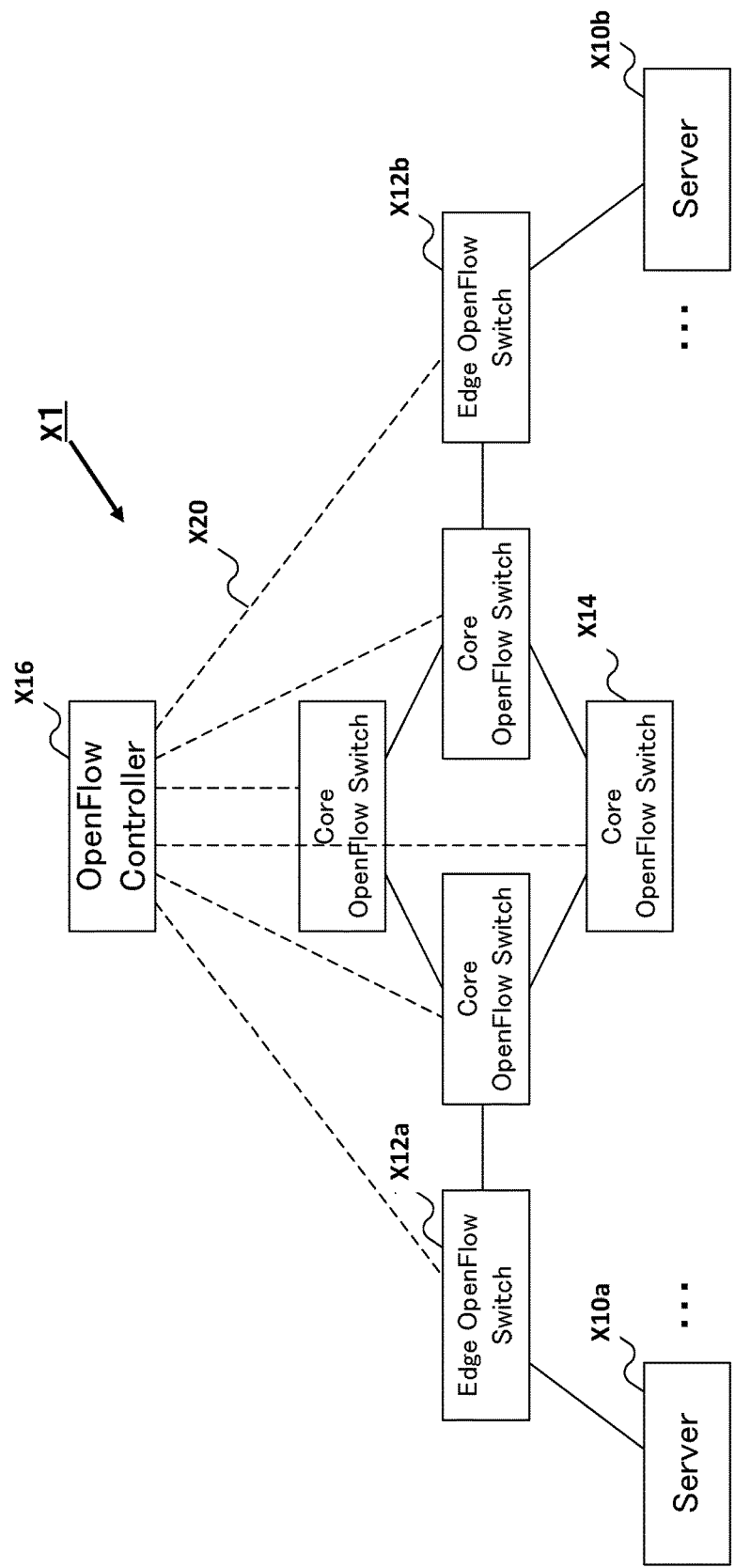
FIG. 21 is a drawing showing a data center network architecture configured using OpenFlow.

FIG. 20 is a flowchart for explaining how an OpenFlow message is processed by the decryption module 166, the encryption module 168, and the ancillary data management module 180-2 after an SSL session has been established.

First, the decryption module 166 refers to the SSL session management buffer 165 on the basis of the information of the session in which the OpenFlow message is transmitted, and acquires a decryption key, an encryption key, and an output session identifier corresponding to the received OpenFlow message (step F1800-3-1).

Next, the decryption module 166 decrypts the OpenFlow message using the acquired decryption key in the step F1800-3-1, and forwards the decrypted OpenFlow message to the ancillary data management module 180-2 (step F1800-3-2).

Next, the ancillary data management module 180-2 refers to the OpenFlow header 210 of the OpenFlow message decrypted in the step F1800-3-2 and determines the message type (step F1800-3-3).

When the message type is the packet_in message 200 ("packet_in message" in the step F1800-3-3), the ancillary data management module 180-2 removes the ancillary data 240 from the OpenFlow message and stores the ancillary data 240 in the ancillary data holding buffer 1840 (step F1800-3-4). Since the details of this processing are described in the first and the second exemplary embodiments of the present invention, a detailed explanation will be omitted.

When the message type is the packet_out message 250 ("packet_out message" in the step F1800-3-3), the ancillary data management module 180-2 acquires the ancillary data 240 from the ancillary data holding buffer 1840 and adds the ancillary data 240 to the OpenFlow message (step F1800-3-5). Since the details of this processing are described in the first and the second exemplary embodiments of the present invention, a detailed explanation will be omitted.

Further, when the message type is neither the packet_in message 200 nor the packet_out message 250 ("other than packet_in and packet_out messages" in the step F1800-3-3), the ancillary data management module 180-2 does not perform any processing related to the ancillary data 240.

The packet_in message 200 or the packet_out message 250 on which the processing related to the ancillary data 240 has been completed, or the OpenFlow message that is neither a packet_in message 200 nor a packet_out message 250 is sent to the encryption module 168. The encryption module 168 encrypts the OpenFlow message using the encryption key acquired in the step F1800-3-1 and forwards the message to the packet input/output module 164 (step F1800-3-6).

The packet input/output module 164 outputs the OpenFlow message encrypted in the step F1800-3-6 to an appropriate destination using the output session identifier acquired in the step F1800-3-1 (step F1800-3-7).

As a result of the processes described above, the virtual switch 120 and the OpenFlow controller 16 are able to exchange OpenFlow messages without losing the ancillary data 240.

As described above, according to the present exemplary embodiment, it becomes possible to process an OpenFlow message without letting the OpenFlow controller 16 know the presence of the ancillary data 240. The reason for this is that the ancillary data manager 18 removes the ancillary data 240 from the packet_in message 200 or adds the ancillary data 240 to the packet_out message 250 so that the ancillary data 240 will not be lost.

Further, the control of the virtual switch 120 is described in the exemplary embodiment above, however, the exemplary embodiment can be applied to a configuration using a physical OpenFlow switch instead of the virtual switch 120.

Each exemplary embodiment of the present invention has been described, however, the present invention is not limited to these exemplary embodiments and further modifications, substitutions, and adjustments can be performed within the scope of the basic technological concept of the present invention. For instance, the network configurations and the numbers of switches used in the exemplary embodiments are merely examples without being limited thereto.

Further, each unit (processing means) of each apparatus used in each exemplary embodiment described above can be realized by a computer program that has a computer constituting these apparatuses execute each processing described above using the hardware thereof.

Finally, preferred modes of the present invention will be summarized.

(Mode 1)
Refer to the communication system according to the first aspect.

(Mode 2)
In the communication system according to mode 1,
the first and the second network switches transmit a control message containing ancillary data to the network controller, and comprise a packet processing unit that retrieves a packet to be outputted and ancillary data from a control message received from the network controller and transmits the packet and the ancillary data to a specified destination.

(Mode 3)
The communication system according to mode 1 or 2, further comprising:
a buffer that holds the ancillary data along with index information; and an ancillary data management unit that stores ancillary data retrieved from a control message received from the network switch in the buffer along with the index information, acquires ancillary data from the buffer based on the index information, and appends the ancillary data to a control message to be transmitted to the second network switch.

(Mode 4)
In the communication system according to mode 3,
an ancillary data management apparatus that manages information of a session between the network controller and the network switch, and relays the transmission and reception of a message between the network controller and the network switch is provided as the ancillary data management unit.

(Mode 5)
In the communication system of any one of modes 1 to 4,
the network switch is an OpenFlow switch, and the network controller is an OpenFlow controller.

(Mode 6)
In the communication system of mode 5,
the ancillary data is inserted at an end of a packet_in message and a packet_out message, and a value of a message length in an OpenFlow header included in a packet_in message, a value indicating a length of packet data in a packet_in message header, and a value of a message length in an OpenFlow header included in a packet_out message are changed, respectively, to values that include ancillary data.

(Mode 7)
In the communication system of mode 6,
a header portion until a layer that includes information specifying at least a frame length is copied from the header of an Ethernet frame included in packet data out of the packet data included in the packet_in message and the packet_out message, the packet data is encapsulated, and the information specifying the frame length in a header added to the packet data is changed to a value that includes ancillary data.
(Mode 8)
The communication system of mode 6 encapsulating the packet data using the information of the ancillary data.
(Mode 9)
In the communication system according to any one of claims 1 to 4, position information of ancillary data is identified from a difference between an original packet length and header information whose packet length is rewritten to include ancillary data for a packet to be forwarded in the control message.
(Mode 10)
Refer to the network switch according to the second aspect.
(Mode 11)
Refer to the network controller according to the second aspect.
(Mode 12)
Refer to the ancillary data management apparatus according to the second aspect.
(Mode 13)
Refer to the data forwarding method according to the third aspect.
(Mode 14)
Refer to the program according to the fourth aspect.
Further, like mode 1, modes 10 to 14 can be developed into modes 2 to 9.

Further, the disclosure of each Patent Literature and Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned. Particularly, the ranges of the numerical values used in the present description should be interpreted as a specific numeric value or small range included in these ranges even in cases where no explanation is provided.

For instance, the present invention can be applied to a network that includes a software switch supporting the OpenFlow protocol and an OpenFlow controller that controls the switch.

X1, X2: data center network architecture
3: ancillary data retention system
10a, 10b, X10, X10a, X10b: server
12, 12a, 12b, X12: OpenFlow switch (network switch)
X12a, X12b: edge OpenFlow switch
14, X14: core OpenFlow switch
16, X16: OpenFlow controller (network controller)
18: ancillary data manager
20, X20: network management link
100, X100: virtual machine monitor
110, X110, X110a, X110b: virtual machine
120, 120a, 120b, X120, X120a, X120b: virtual switch
164, X164: packet input/output module
165: SSL session management buffer
166, X166: decryption module
166-2: packet_in message decryption module
167: packet_in message encryption module
168, X168: encryption module
168-2: packet_out message encryption module
169: packet_out message decryption module
170, X170: OpenFlow message control module
180, 180A, 180-2: ancillary data management module
200, X200: packet_in message
210, X210: OpenFlow header
220, X220: packet_in message header
222: Ethernet frame header
225, X225: packet_out message header
230, X230: packet data
240: ancillary data
250, X250: packet_out message
1200, X1200: packet input module
1210, X1210: packet forwarding processing module
1220, X1220: flow table
1230, X1230: OpenFlow message processing module
1231: packet data input/output module
1232: asynchronous message processing module
1233: controller-to-switch message processing module
1234: symmetric message processing module
1236: OpenFlow message input/output module
1237: packet_in message processing module
1237.1: data field separation module
1237.2: Ethernet frame generation module
1237.4: packet_in message construction module
1238: packet_out message processing module
1238.1: OpenFlow message field separation module
1238.2: packet buffer restoring module
1238.4: packet data construction module
1239: individual message processing module
1240, X1240: secure channel control module
1250, X1250: packet output module
1650: input session identifier
1652: decryption key
1654: encryption key
1656: output session identifier
1800: ancillary data separation module
1820: ancillary data adding module
1840: ancillary data holding buffer
1860: message type determination module

The invention claimed is:

1. A communication system comprising:
a first network switch configured to transmit, to a network controller, a control message containing ancillary data, the ancillary data including data that is not included in header information;
the network controller, which is configured to retrieve the ancillary data from the control message containing the ancillary data, to hold the ancillary data, and to transmit, to a second network switch, a control message containing the ancillary data; and
the second network switch configured to receive the control message containing the ancillary data from the network controller, to retrieve a packet to be outputted and the ancillary data, and to forward the packet and the ancillary data to a specified destination.

2. The communication system according to claim 1, wherein the first and the second network switches are configured to transmit a control message containing ancillary data to the network controller, and comprise at least one processor configured to execute a packet processing unit that retrieves a packet to be outputted and ancillary data from a control message received from the network controller and transmits the packet and the ancillary data to a specified destination.

3. The communication system according to claim 2, wherein the network controller further comprises a buffer configured to hold the ancillary data along with index information; and wherein the network controller is configured to execute an ancillary data management unit that stores ancillary data retrieved from a control message received from a network switch in the buffer along with the index information, acquires ancillary data from the buffer based on the index information, and appends the ancillary data to a control message to be transmitted to the second network switch.

4. The communication system according to claim 3, wherein the ancillary data management unit manages information of a session between the network controller and the network switch, and relays the transmission and reception of a message between the network controller and the network switch.

5. The communication system according to claim 1, wherein the network controller further comprises a buffer configured to hold the ancillary data along with index information, and
wherein the network controller is configured to execute an ancillary data management unit that is configured to store ancillary data retrieved from a control message received from the network switch in the buffer along with the index information, acquires ancillary data from the buffer based on the index information, and appends the ancillary data to a control message to be transmitted to the second network switch.

6. The communication system according to claim 5, wherein the ancillary data management unit manages information of a session between the network controller and the network switch, and to relay the transmission and reception of a message between the network controller and the network switch.

7. The communication system according to claim 1, wherein the network controller is configured such that position information of ancillary data is identified based on an original packet length and header information whose packet length is rewritten to include ancillary data for a packet to be forwarded in the control message.

8. The communication system according to claim 1, wherein the ancillary data includes data formatted for internal processing within a server.

9. The communication system according to claim 1, wherein the ancillary data includes data formatted in a socket buffer structure.

10. The communication system according to claim 1, wherein the ancillary data includes data written to a control buffer region included in a Linux socket buffer structure.

11. The communication system according to claim 1, wherein the ancillary data includes tenant information in a multi-tenant data center.

12. The communication system according to claim 1, wherein the ancillary data includes tunnel information for network tunneling.

13. A network switch comprising:
at least one processor configured to include ancillary data in a control message to a network controller, the ancillary data including data that is not included in header information,
wherein the at least one processor is configured to transmit to the network controller the control message containing the ancillary data,
wherein the control message is configured such that the network controller retrieves the ancillary data from the control message, and
wherein the at least one processor is configured to retrieve the ancillary data from a control message received from the network controller, to retrieve a packet to be outputted and the ancillary data, and to forward the packet and the ancillary data to a specified destination.

14. A network controller comprising:
at least one processor configured to retrieve ancillary data from a control message received from a first network switch and hold the ancillary data, the ancillary data including data that is not included in header information,
wherein the at least one processor is configured to transmit, to a second network switch, a control message containing the held ancillary data, and
wherein the second network switch is configured to receive the control message transmitted by the network controller, retrieve a packet to be outputted and the ancillary data, and forward the packet and the ancillary data to a specified destination.

15. A data forwarding method comprising:
by a first network switch, transmitting to a network controller, a control message containing ancillary data, the ancillary data including data that is not included in header information;
by the network controller, retrieving the ancillary data from the control message containing the ancillary data and holding the ancillary data;
by the network controller, transmitting to a second network switch, a control message containing the ancillary data; and
by the second network switch, receiving the control message containing the ancillary data from the network controller, retrieving a packet to be outputted and the ancillary data, and forwarding the packet and the ancillary data to a specified destination.

* * * * *